US012658074B2

(12) United States Patent
Hoke et al.

(10) Patent No.: US 12,658,074 B2
(45) Date of Patent: Jun. 16, 2026

(54) SIMULATED TISSUE STRUCTURE FOR SURGICAL TRAINING

(71) Applicant: Applied Medical Resources Corporation, Rancho Santa Margarita, CA (US)

(72) Inventors: Adam Hoke, Shelbyville, MI (US); Tracy Breslin, Trabuco Canyon, CA (US); Charles C. Hart, Rancho Santa Margarita, CA (US); Eduardo Bolanos, Rancho Santa Margarita, CA (US)

(73) Assignee: Applied Medical Resources Corporation, Rancho Santa Margarita, CA (US)

( * ) Notice: Subject to any disclaimer, the term of this patent is extended or adjusted under 35 U.S.C. 154(b) by 184 days.

(21) Appl. No.: 18/746,563

(22) Filed: Jun. 18, 2024

(65) Prior Publication Data

US 2024/0339049 A1    Oct. 10, 2024

Related U.S. Application Data

(63) Continuation of application No. 17/510,655, filed on Oct. 26, 2021, now Pat. No. 12,014,652, which is a
(Continued)

(51) Int. Cl.
*G09B 23/34* (2006.01)
*G09B 23/28* (2006.01)
*G09B 23/30* (2006.01)

(52) U.S. Cl.
CPC ............. *G09B 23/34* (2013.01); *G09B 23/28* (2013.01); *G09B 23/30* (2013.01)

(58) Field of Classification Search
CPC ......... G09B 23/28; G09B 23/30; G09B 23/34
See application file for complete search history.

(56) References Cited

U.S. PATENT DOCUMENTS

| | | | |
|---|---|---|---|
| 184,573 A | 11/1876 | Becker | |
| 2,127,774 A | 8/1938 | Jacobson | |

(Continued)

FOREIGN PATENT DOCUMENTS

| | | |
|---|---|---|
| CA | 2 293 585 A1 | 12/1998 |
| CN | 2421706 Y | 2/2001 |

(Continued)

OTHER PUBLICATIONS

European Patent Office, Extended European Search Report for European Patent Application No. 23180886.6, titled "Simulated Dissectible Tissue," dated Dec. 21, 2023, 14 pgs.
(Continued)

*Primary Examiner* — Dmitry Suhol
*Assistant Examiner* — Alyssa N Brandley
(74) *Attorney, Agent, or Firm* — Shirin Bozorgui; Patrick Ikehara

(57) ABSTRACT

A simulated tissue structure for practicing surgical techniques is provided. In particular, a realistic organ model or tissue portion for practicing the removal of a tumor or other undesired tissue followed by suturing a remnant defect as part of the same surgical procedure is provided. The simulated tissue structure includes an artificial tumor disposed between layers of elastomeric material and mounted on a simulated organ wall or tissue portion. The simulated tissue structure is modular and interchangeable. At least one of the layers includes a mesh reinforcement. A defect comprising two juxtapositioned surfaces defining a gap between the surfaces is created in the simulated tissue structure and the trainee practices tumor removal and closure of the gap by suturing in a laparoscopic environment.

20 Claims, 10 Drawing Sheets

Related U.S. Application Data continuation of application No. 14/940,444, filed on Nov. 13, 2015, now Pat. No. 11,158,212, which is a continuation of application No. 13/656,467, filed on Oct. 19, 2012, now Pat. No. 9,218,753.

(60) Provisional application No. 61/549,838, filed on Oct. 21, 2011.

(56) References Cited

U.S. PATENT DOCUMENTS

| | | | |
|---|---|---|---|
| 2,284,888 A | 6/1942 | Arneil, Jr. | |
| 2,495,568 A | 1/1950 | Coel | |
| 3,789,518 A | 2/1974 | Chase | |
| 3,921,311 A | 11/1975 | Beasley et al. | |
| 3,991,490 A | 11/1976 | Markman | |
| 4,001,951 A | 1/1977 | Fasse | |
| 4,332,569 A | 6/1982 | Burbank | |
| 4,371,345 A | 2/1983 | Palmer et al. | |
| 4,459,113 A | 7/1984 | Boscaro Gatti et al. | |
| 4,481,001 A | 11/1984 | Graham et al. | |
| 4,596,528 A | 6/1986 | Lewis et al. | |
| 4,726,772 A | 2/1988 | Amplatz | |
| 4,737,109 A | 4/1988 | Abramson | |
| 4,789,340 A | 12/1988 | Zikria | |
| 4,907,973 A | 3/1990 | Hon | |
| 4,938,696 A | 7/1990 | Foster et al. | |
| 5,061,187 A | 10/1991 | Jerath | |
| 5,083,962 A | 1/1992 | Pracas | |
| 5,104,328 A | 4/1992 | Lounsbury | |
| 5,149,270 A | 9/1992 | McKeown | |
| 5,180,308 A | 1/1993 | Garito et al. | |
| 5,230,630 A | 7/1993 | Burgett | |
| 5,273,435 A | 12/1993 | Jacobson | |
| 5,295,694 A | 3/1994 | Levin | |
| 5,318,448 A | 6/1994 | Garito et al. | |
| 5,320,537 A | 6/1994 | Watson | |
| 5,358,408 A | 10/1994 | Medina | |
| 5,368,487 A | 11/1994 | Medina | |
| 5,403,191 A | 4/1995 | Tuason | |
| 5,425,644 A | 6/1995 | Szinicz | |
| 5,425,731 A | 6/1995 | Daniel et al. | |
| 5,472,345 A | 12/1995 | Eggert | |
| 5,518,406 A | 5/1996 | Waters | |
| 5,518,407 A | 5/1996 | Greenfield et al. | |
| 5,520,633 A | 5/1996 | Costin | |
| 5,620,326 A | 4/1997 | Younker | |
| 5,720,742 A | 2/1998 | Zacharias | |
| 5,722,836 A | 3/1998 | Younker | |
| 5,727,948 A | 3/1998 | Jordan | |
| 5,762,458 A | 6/1998 | Wang et al. | |
| 5,769,640 A | 6/1998 | Jacobus et al. | |
| 5,775,916 A | 7/1998 | Cooper et al. | |
| 5,785,531 A | 7/1998 | Leung | |
| 5,800,178 A | 9/1998 | Gillio | |
| 5,803,746 A | 9/1998 | Barrie et al. | |
| 5,807,378 A | 9/1998 | Jensen et al. | |
| 5,810,880 A | 9/1998 | Jensen et al. | |
| 5,814,038 A | 9/1998 | Jensen et al. | |
| 5,850,033 A | 12/1998 | Mirzeabasov et al. | |
| 5,855,583 A | 1/1999 | Wang et al. | |
| 5,873,732 A | 2/1999 | Hasson | |
| 5,873,863 A | 2/1999 | Komlosi | |
| 5,908,302 A | 6/1999 | Goldfarb | |
| 5,947,743 A | 9/1999 | Hasson | |
| 5,951,301 A | 9/1999 | Younker | |
| 6,080,181 A | 6/2000 | Jensen et al. | |
| 6,083,008 A | 7/2000 | Yamada et al. | |
| 6,113,395 A | 9/2000 | Hon | |
| 6,234,804 B1 | 5/2001 | Yong | |
| 6,271,278 B1 | 8/2001 | Park et al. | |
| 6,336,812 B1 | 1/2002 | Cooper et al. | |
| 6,398,557 B1 | 6/2002 | Hoballah | |
| 6,413,264 B1 | 7/2002 | Jensen et al. | |
| 6,474,993 B1 | 11/2002 | Grund et al. | |
| 6,485,308 B1 | 11/2002 | Goldstein | |
| 6,488,507 B1 | 12/2002 | Stoloff et al. | |
| 6,511,325 B1 | 1/2003 | Lalka et al. | |
| 6,517,354 B1 | 2/2003 | Levy | |
| 6,568,941 B1 | 5/2003 | Goldstein | |
| 6,589,057 B1 | 7/2003 | Keenan et al. | |
| 6,620,174 B2 | 9/2003 | Jensen et al. | |
| 6,654,000 B2 | 11/2003 | Rosenberg | |
| 6,659,776 B1 | 12/2003 | Aumann et al. | |
| 6,773,263 B2 | 8/2004 | Nicholls et al. | |
| 6,780,016 B1 | 8/2004 | Toly | |
| 6,817,973 B2 | 11/2004 | Merril et al. | |
| 6,820,025 B2 | 11/2004 | Bachmann et al. | |
| 6,857,878 B1 | 2/2005 | Chosack et al. | |
| 6,863,536 B1 | 3/2005 | Fisher et al. | |
| 6,866,514 B2 | 3/2005 | Von Roeschlaub et al. | |
| 6,887,082 B2 | 5/2005 | Shun | |
| 6,929,481 B1 | 8/2005 | Alexander et al. | |
| 6,939,138 B2 | 9/2005 | Chosack et al. | |
| 6,950,025 B1 | 9/2005 | Nguyen | |
| 6,997,719 B2 | 2/2006 | Wellman et al. | |
| 7,008,232 B2 | 3/2006 | Brassel | |
| 7,025,064 B2 | 4/2006 | Wang et al. | |
| 7,056,123 B2 | 6/2006 | Gregorio et al. | |
| 7,080,984 B1 | 7/2006 | Cohen | |
| 7,118,582 B1 | 10/2006 | Wang et al. | |
| 7,255,565 B2 | 8/2007 | Keegan | |
| 7,269,532 B2 | 9/2007 | David et al. | |
| 7,272,766 B2 | 9/2007 | Sakezles | |
| 7,300,450 B2 | 11/2007 | Vleugels et al. | |
| 7,364,582 B2 | 4/2008 | Lee | |
| 7,404,716 B2 | 7/2008 | Gregorio et al. | |
| 7,419,376 B2 | 9/2008 | Sarvazyan et al. | |
| 7,427,199 B2 | 9/2008 | Sakezles | |
| 7,431,189 B2 | 10/2008 | Shelton, IV et al. | |
| 7,441,684 B2 | 10/2008 | Shelton, IV et al. | |
| 7,465,168 B2 | 12/2008 | Allen et al. | |
| 7,467,075 B2 | 12/2008 | Humphries et al. | |
| 7,544,062 B1 | 6/2009 | Hauschild et al. | |
| 7,549,866 B2 | 6/2009 | Cohen et al. | |
| 7,553,159 B1 | 6/2009 | Arnal et al. | |
| 7,575,434 B2 | 8/2009 | Palakodeti | |
| 7,594,815 B2 | 9/2009 | Toly | |
| 7,648,367 B1 | 1/2010 | Makower et al. | |
| 7,648,513 B2 | 1/2010 | Green et al. | |
| 7,651,332 B2 | 1/2010 | Dupuis et al. | |
| 7,677,897 B2 | 3/2010 | Sakezles | |
| 7,775,916 B1 | 8/2010 | Mahoney | |
| 7,780,451 B2 | 8/2010 | Willobee et al. | |
| 7,802,990 B2 | 9/2010 | Korndorffer et al. | |
| 7,803,151 B2 | 9/2010 | Whitman | |
| 7,806,696 B2 | 10/2010 | Alexander et al. | |
| 7,819,799 B2 | 10/2010 | Merril et al. | |
| 7,833,018 B2 | 11/2010 | Alexander et al. | |
| 7,837,473 B2 | 11/2010 | Koh | |
| 7,850,454 B2 | 12/2010 | Toly | |
| 7,850,456 B2 | 12/2010 | Chosack et al. | |
| 7,854,612 B2 | 12/2010 | Frassica et al. | |
| 7,857,626 B2 | 12/2010 | Toly | |
| 7,866,983 B2 | 1/2011 | Hemphill et al. | |
| 7,931,470 B2 | 4/2011 | Alexander et al. | |
| 7,931,471 B2 | 4/2011 | Senagore et al. | |
| 7,993,140 B2 | 8/2011 | Sakezles | |
| 8,007,281 B2 | 8/2011 | Toly | |
| 8,007,282 B2 | 8/2011 | Gregorio et al. | |
| 8,016,818 B2 | 9/2011 | Ellis et al. | |
| 8,017,107 B2 | 9/2011 | Thomas et al. | |
| 8,048,088 B2 | 11/2011 | Green et al. | |
| 8,083,691 B2 | 12/2011 | Goldenberg et al. | |
| 8,116,847 B2 | 2/2012 | Gattani et al. | |
| 8,157,145 B2 | 4/2012 | Shelton, IV et al. | |
| 8,197,464 B2 | 6/2012 | Krever et al. | |
| 8,205,779 B2 | 6/2012 | Ma et al. | |
| 8,221,129 B2 | 7/2012 | Parry et al. | |
| 8,297,982 B2 | 10/2012 | Park et al. | |
| 8,308,817 B2 | 11/2012 | Egilsson et al. | |
| 8,323,028 B2 | 12/2012 | Matanhelia | |
| 8,323,029 B2 | 12/2012 | Toly | |
| 8,328,560 B2 | 12/2012 | Niblock et al. | |

(56) References Cited

U.S. PATENT DOCUMENTS

| | | | |
|---|---|---|---|
| 8,342,851 | B1 | 1/2013 | Speeg et al. |
| 8,403,674 | B2 | 3/2013 | Feygin et al. |
| 8,403,675 | B2 | 3/2013 | Stoianovici et al. |
| 8,403,676 | B2 | 3/2013 | Frassica et al. |
| 8,439,687 | B1 | 5/2013 | Morriss et al. |
| 8,442,621 | B2 | 5/2013 | Gorek et al. |
| 8,454,368 | B2 | 6/2013 | Ault et al. |
| 8,459,094 | B2 | 6/2013 | Yanni |
| 8,459,520 | B2 | 6/2013 | Giordano et al. |
| 8,460,002 | B2 | 6/2013 | Wang et al. |
| 8,465,771 | B2 | 6/2013 | Wan et al. |
| 8,469,716 | B2 | 6/2013 | Fedotov et al. |
| 8,480,407 | B2 | 7/2013 | Campbell et al. |
| 8,480,408 | B2 | 7/2013 | Ishii et al. |
| 8,491,309 | B2 | 7/2013 | Parry et al. |
| 8,500,753 | B2 | 8/2013 | Green et al. |
| 8,517,243 | B2 | 8/2013 | Giordano et al. |
| 8,521,252 | B2 | 8/2013 | Diez |
| 8,544,711 | B2 | 10/2013 | Ma et al. |
| 8,556,635 | B2 | 10/2013 | Toly |
| 8,613,621 | B2 | 12/2013 | Henderickson et al. |
| D699,297 | S | 2/2014 | Bahsooun et al. |
| 8,641,423 | B2 | 2/2014 | Gumkowski |
| 8,647,125 | B2 | 2/2014 | Johns et al. |
| 8,708,213 | B2 | 4/2014 | Shelton, IV et al. |
| 8,708,707 | B2 | 4/2014 | Hendrickson et al. |
| 8,764,452 | B2 | 7/2014 | Pravong et al. |
| 8,800,839 | B2 | 8/2014 | Beetel |
| 8,801,438 | B2 | 8/2014 | Sakezles |
| 8,807,414 | B2 | 8/2014 | Ross et al. |
| 8,808,311 | B2 | 8/2014 | Heinrich et al. |
| 8,827,988 | B2 | 9/2014 | Belson et al. |
| 8,840,628 | B2 | 9/2014 | Green et al. |
| 8,870,576 | B2 | 10/2014 | Millon et al. |
| 8,893,946 | B2 | 11/2014 | Boudreaux et al. |
| 8,911,238 | B2 | 12/2014 | Forsythe |
| 8,915,742 | B2 | 12/2014 | Hendrickson et al. |
| 8,945,095 | B2 | 2/2015 | Blumenkranz et al. |
| 8,961,190 | B2 | 2/2015 | Hart et al. |
| 8,966,954 | B2 | 3/2015 | Ni et al. |
| 8,968,003 | B2 | 3/2015 | Hendrickson et al. |
| 9,008,989 | B2 | 4/2015 | Wilson et al. |
| 9,026,247 | B2 | 5/2015 | White |
| 9,050,201 | B2 | 6/2015 | Egilsson et al. |
| 9,096,744 | B2 | 8/2015 | Wan et al. |
| 9,117,377 | B2 | 8/2015 | Shim et al. |
| 9,119,572 | B2 | 9/2015 | Gorek et al. |
| 9,123,261 | B2 | 9/2015 | Lowe |
| 9,129,054 | B2 | 9/2015 | Nawana et al. |
| 9,196,176 | B2 | 11/2015 | Hager et al. |
| 9,226,799 | B2 | 1/2016 | Lightcap et al. |
| 9,257,055 | B2 | 2/2016 | Endo et al. |
| 9,265,587 | B2 | 2/2016 | Vancamberg et al. |
| 9,295,468 | B2 | 3/2016 | Heinrich et al. |
| 9,336,694 | B2 | 5/2016 | Shim et al. |
| 9,351,714 | B2 | 5/2016 | Ross et al. |
| 9,358,682 | B2 | 6/2016 | Ruiz Morales |
| 9,364,224 | B2 | 6/2016 | Nicholas et al. |
| 9,364,279 | B2 | 6/2016 | Houser et al. |
| 9,370,361 | B2 | 6/2016 | Viola et al. |
| 9,373,270 | B2 | 6/2016 | Miyazaki |
| 9,387,276 | B2 | 7/2016 | Sun et al. |
| 9,427,496 | B2 | 8/2016 | Sun et al. |
| 9,439,649 | B2 | 9/2016 | Shelton, IV et al. |
| 9,439,733 | B2 | 9/2016 | Ha et al. |
| 9,449,532 | B2 | 9/2016 | Black et al. |
| 9,468,438 | B2 | 10/2016 | Baber et al. |
| 2001/0019818 | A1 | 9/2001 | Yong |
| 2003/0091967 | A1 | 5/2003 | Chosack et al. |
| 2003/0176770 | A1 | 9/2003 | Merril et al. |
| 2004/0005423 | A1 | 1/2004 | Dalton et al. |
| 2004/0126746 | A1 | 7/2004 | Toly |
| 2004/0248072 | A1 | 12/2004 | Gray et al. |
| 2005/0008997 | A1 | 1/2005 | Herman |
| 2005/0026125 | A1* | 2/2005 | Toly ..................... G09B 23/285 |
| | | | 434/262 |
| 2005/0064378 | A1 | 3/2005 | Toly |
| 2005/0084833 | A1 | 4/2005 | Lacey et al. |
| 2005/0131390 | A1 | 6/2005 | Heinrich et al. |
| 2005/0142525 | A1 | 6/2005 | Cotin et al. |
| 2005/0192595 | A1 | 9/2005 | Green et al. |
| 2005/0196739 | A1 | 9/2005 | Moriyama |
| 2005/0196740 | A1 | 9/2005 | Moriyana |
| 2005/0214727 | A1 | 9/2005 | Stoianovici et al. |
| 2006/0046235 | A1 | 3/2006 | Alexander et al. |
| 2006/0232664 | A1 | 10/2006 | Toly |
| 2006/0252019 | A1 | 11/2006 | Burkitt et al. |
| 2006/0275741 | A1 | 12/2006 | Chewning et al. |
| 2007/0074584 | A1 | 4/2007 | Talarico et al. |
| 2007/0078484 | A1 | 4/2007 | Talarico et al. |
| 2007/0148626 | A1 | 6/2007 | Ikeda |
| 2007/0166682 | A1 | 7/2007 | Yarin et al. |
| 2007/0197895 | A1 | 8/2007 | Nycz et al. |
| 2007/0225734 | A1 | 9/2007 | Bell et al. |
| 2007/0238081 | A1 | 10/2007 | Koh |
| 2007/0275359 | A1 | 11/2007 | Rotnes et al. |
| 2008/0032272 | A1* | 2/2008 | Palakodeti ............. G09B 23/28 |
| | | | 434/262 |
| 2008/0032273 | A1 | 2/2008 | Macnamara et al. |
| 2008/0052034 | A1 | 2/2008 | David et al. |
| 2008/0064017 | A1 | 3/2008 | Grundmeyer, III |
| 2008/0097501 | A1 | 4/2008 | Blier |
| 2008/0108869 | A1 | 5/2008 | Sanders et al. |
| 2008/0187895 | A1 | 8/2008 | Sakezles |
| 2008/0188948 | A1 | 8/2008 | Flatt |
| 2008/0299529 | A1 | 12/2008 | Schaller |
| 2008/0317818 | A1 | 12/2008 | Griffith et al. |
| 2009/0068627 | A1 | 3/2009 | Toly |
| 2009/0142739 | A1 | 6/2009 | Wang et al. |
| 2009/0142741 | A1 | 6/2009 | Ault et al. |
| 2009/0143642 | A1 | 6/2009 | Takahashi et al. |
| 2009/0176196 | A1 | 7/2009 | Niblock et al. |
| 2009/0187079 | A1 | 7/2009 | Albrecht et al. |
| 2009/0246747 | A1 | 10/2009 | Buckman, Jr. |
| 2009/0298034 | A1 | 12/2009 | Parry et al. |
| 2009/0314550 | A1 | 12/2009 | Layton |
| 2010/0094312 | A1 | 4/2010 | Ruiz Morales et al. |
| 2010/0099067 | A1 | 4/2010 | Agro |
| 2010/0167248 | A1 | 7/2010 | Ryan |
| 2010/0167249 | A1 | 7/2010 | Ryan |
| 2010/0167250 | A1 | 7/2010 | Ryan et al. |
| 2010/0167253 | A1 | 7/2010 | Ryan et al. |
| 2010/0167254 | A1 | 7/2010 | Nguyen |
| 2010/0204713 | A1 | 8/2010 | Ruiz Morales |
| 2010/0209899 | A1 | 8/2010 | Park |
| 2010/0248200 | A1 | 9/2010 | Ladak |
| 2010/0258611 | A1 | 10/2010 | Smith et al. |
| 2010/0273136 | A1 | 10/2010 | Kandasami et al. |
| 2010/0279263 | A1 | 11/2010 | Duryea |
| 2010/0285094 | A1 | 11/2010 | Gupta |
| 2010/0324541 | A1 | 12/2010 | Whitman |
| 2011/0020779 | A1 | 1/2011 | Hannaford et al. |
| 2011/0046637 | A1 | 2/2011 | Patel et al. |
| 2011/0046659 | A1 | 2/2011 | Ramstein et al. |
| 2011/0087238 | A1 | 4/2011 | Wang et al. |
| 2011/0091855 | A1 | 4/2011 | Miyazaki |
| 2011/0137337 | A1 | 6/2011 | van den Dool et al. |
| 2011/0200976 | A1 | 8/2011 | Hou et al. |
| 2011/0207104 | A1 | 8/2011 | Trotta |
| 2011/0218550 | A1 | 9/2011 | Ma |
| 2011/0269109 | A2 | 11/2011 | Miyazaki |
| 2011/0281251 | A1 | 11/2011 | Mousques |
| 2011/0301620 | A1 | 12/2011 | Di Betta et al. |
| 2012/0015337 | A1 | 1/2012 | Hendrickson et al. |
| 2012/0015339 | A1 | 1/2012 | Hendrickson et al. |
| 2012/0016362 | A1 | 1/2012 | Heinrich et al. |
| 2012/0028231 | A1 | 2/2012 | Misawa et al. |
| 2012/0034587 | A1 | 2/2012 | Toly |
| 2012/0045743 | A1 | 2/2012 | Misawa et al. |
| 2012/0065632 | A1 | 3/2012 | Shadduck |
| 2012/0082970 | A1 | 4/2012 | Pravong et al. |
| 2012/0115117 | A1 | 5/2012 | Marshall |
| 2012/0115118 | A1 | 5/2012 | Marshall |

(56) References Cited

U.S. PATENT DOCUMENTS

| | | |
|---|---|---|
| 2012/0116391 A1 | 5/2012 | Houser et al. |
| 2012/0148994 A1 | 6/2012 | Hori et al. |
| 2012/0164616 A1 | 6/2012 | Endo et al. |
| 2012/0165866 A1 | 6/2012 | Kaiser et al. |
| 2012/0172873 A1 | 7/2012 | Artale et al. |
| 2012/0179072 A1 | 7/2012 | Kegreiss |
| 2012/0202180 A1 | 8/2012 | Stock et al. |
| 2012/0264096 A1 | 10/2012 | Taylor et al. |
| 2012/0264097 A1 | 10/2012 | Newcott et al. |
| 2012/0282583 A1 | 11/2012 | Thaler et al. |
| 2012/0282584 A1 | 11/2012 | Millon et al. |
| 2012/0283707 A1 | 11/2012 | Giordano et al. |
| 2012/0308977 A1 | 12/2012 | Tortola |
| 2013/0087597 A1 | 4/2013 | Shelton, IV et al. |
| 2013/0101973 A1 | 4/2013 | Hoke et al. |
| 2013/0105552 A1 | 5/2013 | Weir et al. |
| 2013/0116668 A1 | 5/2013 | Shelton, IV et al. |
| 2013/0157240 A1* | 6/2013 | Hart ........................ G09B 23/30 |
| | | 434/267 |
| 2013/0171288 A1 | 7/2013 | Harders |
| 2013/0177890 A1 | 7/2013 | Sakezles |
| 2013/0218166 A1 | 8/2013 | Elmore |
| 2013/0224709 A1 | 8/2013 | Riojas et al. |
| 2013/0245681 A1 | 9/2013 | Straehnz et al. |
| 2013/0253480 A1 | 9/2013 | Kimball et al. |
| 2013/0267876 A1 | 10/2013 | Leckenby et al. |
| 2013/0282038 A1 | 10/2013 | Dannaher et al. |
| 2013/0302771 A1 | 11/2013 | Alderete |
| 2013/0324991 A1 | 12/2013 | Clem et al. |
| 2013/0324999 A1 | 12/2013 | Price et al. |
| 2014/0011172 A1 | 1/2014 | Lowe |
| 2014/0017651 A1 | 1/2014 | Sugimoto et al. |
| 2014/0030682 A1 | 1/2014 | Thilenius |
| 2014/0038151 A1 | 2/2014 | Hart |
| 2014/0051049 A1 | 2/2014 | Jarc et al. |
| 2014/0072941 A1 | 3/2014 | Hendrickson et al. |
| 2014/0087345 A1 | 3/2014 | Breslin et al. |
| 2014/0087346 A1 | 3/2014 | Breslin et al. |
| 2014/0087347 A1 | 3/2014 | Tracy et al. |
| 2014/0087348 A1 | 3/2014 | Tracy et al. |
| 2014/0088413 A1 | 3/2014 | Von Bucsh et al. |
| 2014/0093852 A1 | 4/2014 | Poulsen et al. |
| 2014/0093854 A1 | 4/2014 | Poulsen et al. |
| 2014/0106328 A1 | 4/2014 | Loor |
| 2014/0107471 A1 | 4/2014 | Haider et al. |
| 2014/0170623 A1 | 6/2014 | Jarstad et al. |
| 2014/0186809 A1 | 7/2014 | Hendrickson et al. |
| 2014/0187855 A1 | 7/2014 | Nagale et al. |
| 2014/0200561 A1 | 7/2014 | Ingmanson et al. |
| 2014/0220530 A1 | 8/2014 | Merkle et al. |
| 2014/0242564 A1 | 8/2014 | Pravong et al. |
| 2014/0246479 A1 | 9/2014 | Baber et al. |
| 2014/0248596 A1 | 9/2014 | Hart et al. |
| 2014/0263538 A1 | 9/2014 | Leimbach et al. |
| 2014/0272878 A1 | 9/2014 | Shim et al. |
| 2014/0272879 A1 | 9/2014 | Shim et al. |
| 2014/0275795 A1 | 9/2014 | Little et al. |
| 2014/0275981 A1 | 9/2014 | Selover et al. |
| 2014/0277017 A1 | 9/2014 | Leimbach et al. |
| 2014/0303643 A1 | 10/2014 | Ha et al. |
| 2014/0303646 A1 | 10/2014 | Morgan et al. |
| 2014/0303660 A1 | 10/2014 | Boyden et al. |
| 2014/0342334 A1 | 11/2014 | Black et al. |
| 2014/0349266 A1 | 11/2014 | Choi |
| 2014/0350530 A1 | 11/2014 | Ross et al. |
| 2014/0357977 A1 | 12/2014 | Zhou |
| 2014/0370477 A1 | 12/2014 | Black et al. |
| 2014/0371761 A1 | 12/2014 | Juanpera |
| 2014/0378995 A1 | 12/2014 | Kumar et al. |
| 2015/0076207 A1 | 3/2015 | Boudreaux et al. |
| 2015/0132732 A1 | 5/2015 | Hart et al. |
| 2015/0135832 A1 | 5/2015 | Blumenkranz et al. |
| 2015/0148660 A1 | 5/2015 | Weiss et al. |
| 2015/0164598 A1 | 6/2015 | Blumenkranz et al. |
| 2015/0209035 A1 | 7/2015 | Zemlock |

| | | |
|---|---|---|
| 2015/0209059 A1 | 7/2015 | Trees et al. |
| 2015/0209573 A1 | 7/2015 | Hibner et al. |
| 2015/0228206 A1 | 8/2015 | Shim et al. |
| 2015/0262511 A1 | 9/2015 | Lin et al. |
| 2015/0265431 A1 | 9/2015 | Egilsson et al. |
| 2015/0272571 A1 | 10/2015 | Leimbach et al. |
| 2015/0272574 A1 | 10/2015 | Leimbach et al. |
| 2015/0272580 A1 | 10/2015 | Leimbach et al. |
| 2015/0272581 A1 | 10/2015 | Leimbach et al. |
| 2015/0272583 A1 | 10/2015 | Leimbach et al. |
| 2015/0272604 A1 | 10/2015 | Chowaniec et al. |
| 2015/0332609 A1 | 11/2015 | Alexander |
| 2015/0358426 A1 | 12/2015 | Kimball et al. |
| 2015/0371560 A1 | 12/2015 | Lowe |
| 2015/0374378 A1 | 12/2015 | Giordano et al. |
| 2015/0374449 A1 | 12/2015 | Chowaniec et al. |
| 2016/0000437 A1 | 1/2016 | Giordano et al. |
| 2016/0022374 A1 | 1/2016 | Haider et al. |
| 2016/0030240 A1 | 2/2016 | Gonenc et al. |
| 2016/0031091 A1 | 2/2016 | Popovic et al. |
| 2016/0058534 A1 | 3/2016 | Derwin et al. |
| 2016/0066909 A1 | 3/2016 | Baber et al. |
| 2016/0070436 A1 | 3/2016 | Thomas et al. |
| 2016/0073928 A1 | 3/2016 | Soper et al. |
| 2016/0074103 A1 | 3/2016 | Sartor |
| 2016/0098933 A1 | 4/2016 | Reiley et al. |
| 2016/0104394 A1 | 4/2016 | Miyazaki |
| 2016/0117956 A1 | 4/2016 | Larsson et al. |
| 2016/0125762 A1 | 5/2016 | Becker et al. |
| 2016/0133158 A1 | 5/2016 | Sui et al. |
| 2016/0140876 A1 | 5/2016 | Jabbour et al. |
| 2016/0194378 A1 | 7/2016 | Cass et al. |
| 2016/0199059 A1 | 7/2016 | Shelton, IV et al. |
| 2016/0220150 A1 | 8/2016 | Sharonov |
| 2016/0220314 A1 | 8/2016 | Huelman et al. |
| 2016/0225288 A1 | 8/2016 | East et al. |
| 2016/0232819 A1 | 8/2016 | Hofstetter et al. |
| 2016/0235494 A1 | 8/2016 | Shelton, IV et al. |
| 2016/0256187 A1 | 9/2016 | Shelton, IV et al. |
| 2016/0256229 A1 | 9/2016 | Morgan et al. |
| 2016/0262736 A1 | 9/2016 | Ross et al. |
| 2016/0262745 A1 | 9/2016 | Morgan et al. |
| 2016/0293055 A1 | 10/2016 | Hofstetter |
| 2016/0296144 A1 | 10/2016 | Gaddam et al. |

FOREIGN PATENT DOCUMENTS

| | | |
|---|---|---|
| CN | 2751372 Y | 1/2006 |
| CN | 2909427 Y | 6/2007 |
| CN | 101313842 A | 12/2008 |
| CN | 101528780 A | 9/2009 |
| CN | 201364679 Y | 12/2009 |
| CN | 201955979 U | 8/2011 |
| CN | 102458496 A | 5/2012 |
| CN | 202443680 U | 9/2012 |
| CN | 202563792 U | 11/2012 |
| CN | 202601055 U | 12/2012 |
| CN | 202694651 U | 1/2013 |
| CN | 103050040 A | 4/2013 |
| CN | 203013103 U | 6/2013 |
| CN | 203038549 U | 7/2013 |
| CN | 203338651 U | 12/2013 |
| CN | 203397593 U | 1/2014 |
| CN | 203562128 U | 4/2014 |
| CN | 102596275 B | 6/2014 |
| CN | 103845757 A | 6/2014 |
| CN | 103886797 A | 6/2014 |
| CN | 103396562 B | 7/2015 |
| CN | 105194740 A | 12/2015 |
| CN | 105504166 A | 4/2016 |
| DE | 9102218 U1 | 5/1991 |
| DE | 41 05 892 | 8/1992 |
| DE | 93 20 422 U1 | 6/1994 |
| DE | 44 14 832 | 11/1995 |
| DE | 19716341 C2 | 9/2000 |
| EP | 1 024 173 A1 | 8/2000 |
| EP | 0 990 227 B1 | 4/2002 |
| EP | 1 609 431 A1 | 12/2005 |
| EP | 0 870 292 B1 | 7/2008 |

(56)　　　　　　References Cited

FOREIGN PATENT DOCUMENTS

| EP | 2 068 295 A2 | 6/2009 |
|---|---|---|
| EP | 2 218 570 A1 | 8/2010 |
| FR | 2 691 826 | 12/1993 |
| FR | 2 917 876 | 12/2008 |
| FR | 2 917 876 A1 | 12/2008 |
| GB | 2488994 A | 9/2012 |
| JP | 10 211160 | 8/1998 |
| JP | 2001005378 A | 1/2001 |
| JP | 2006187566 A | 7/2006 |
| JP | 2009063787 A | 3/2009 |
| JP | 2009236963 A | 10/2009 |
| JP | 3162161 U | 8/2010 |
| JP | 2011113056 A | 6/2011 |
| JP | 2013127496 A | 6/2013 |
| KR | 101231565 B1 | 2/2013 |
| MX | PA 02004422 A | 11/2003 |
| PT | 106230 | 9/2013 |
| WO | WO 1994/06109 | 3/1994 |
| WO | WO 1996/042076 | 12/1996 |
| WO | WO 1998/58358 | 12/1998 |
| WO | WO 1999/01074 A1 | 1/1999 |
| WO | WO 2000/36577 | 6/2000 |
| WO | WO/2002/38039 A2 | 5/2002 |
| WO | WO 2002/38039 A3 | 6/2002 |
| WO | WO 2004/032095 | 4/2004 |
| WO | WO 2004/082486 A1 | 9/2004 |
| WO | WO 2005/071639 A1 | 8/2005 |
| WO | WO 2005/083653 A1 | 9/2005 |
| WO | WO 2006/083963 A2 | 8/2006 |
| WO | WO 2007/068360 | 6/2007 |
| WO | WO 2008/021720 A2 | 2/2008 |
| WO | WO 2008/103383 A1 | 8/2008 |
| WO | WO 2009/000939 | 12/2008 |
| WO | WO 2009/089614 A1 | 7/2009 |
| WO | WO 2010/094730 | 8/2010 |
| WO | WO 2011/035410 A1 | 3/2011 |
| WO | WO 2011/046606 A1 | 4/2011 |
| WO | WO 2011/127379 A2 | 10/2011 |
| WO | WO 2011/151304 A1 | 12/2011 |
| WO | WO 2012/149606 A1 | 11/2012 |
| WO | WO 2012/168287 A1 | 12/2012 |
| WO | WO 2012/175993 | 12/2012 |
| WO | WO 2013/048978 A1 | 4/2013 |
| WO | WO 2013/103956 A1 | 7/2013 |
| WO | WO 2014/022815 A1 | 2/2014 |
| WO | WO 2014/093669 A1 | 6/2014 |
| WO | WO 2014/197793 A1 | 12/2014 |
| WO | WO 2015/148817 A1 | 10/2015 |
| WO | WO 2016/138528 A1 | 9/2016 |
| WO | WO 2016/183412 A1 | 11/2016 |
| WO | WO 2016/198238 A1 | 12/2016 |
| WO | WO 2016/201085 A1 | 12/2016 |
| WO | WO 2017/031214 A1 | 2/2017 |
| WO | WO 2017/042301 A1 | 3/2017 |

OTHER PUBLICATIONS

European Patent Office, Extended European Search Report for European Patent Application No. 23186659.1, titled "Hysterectomy Model," dated Mar. 5, 2024, 11 pgs.

European Patent Office, International Search Report for International Application No. PCT/US2011/053859, mailed on May 4, 2012, entitled "Portable Laparoscopic Trainer".

European Patent Office, The International Search Report and Written Opinion for International Application No. PCT/US2012/60997, mailed Mar. 7, 2013, entitled "Simulated Tissue Structure for Surgical Training".

European Patent Office, The International Search Report and Written Opinion for International Application No. PCT/US2012/070971, mailed Mar. 18, 2013, entitled "Advanced Surgical Simulation".

Human Patient Simulator, Medical Education Technologies, Inc., http://www.meti.com (1999) all.

The International Bureau of WIPO, International Preliminary Report on Patentability for International Application No. PCT/US2011/053859, titled "Portable Laparoscopic Trainer" dated Apr. 2, 2013.

European Patent Office, The International Search Report and Written Opinion for International Application No. PCT/US2012/070971, mailed Jul. 4, 2014, entitled "Advanced Surgical Simulation Constructions and Methods".

The International Bureau of WIPO, International Preliminary Report on Patentability for International Application No. PCT/US2012/070971, titled "Advanced Surgical Simulation" dated ,Jul. 3, 2014.

The International Bureau of WIPO, International Preliminary Report on Patentability for International Application No. PCT/US2012/060997, titled "Simulated Tissue Structure for Surgical Training" dated Apr. 22, 2014.

European Patent Office, The International Search Report and Written Opinion for International Application No. PCT/US2013/062363, mailed Jan. 22, 2014, entitled "Surgical Training Model for Laparoscopic Procedures."

European Patent Office, The International Search Report and Written Opinion for International Application No. PCT/US2013/061949, mailed Feb. 17, 2014, entitled "Surgical Training Model for Laparoscopic Procedures."

Anonymous: Realsim Systems—LTS2000, Sep. 4, 2005, pp. 1-2, XP055096193, Retrieved from the Internet: URL:https://web.archive.org/web/2005090403;3030/http://www.realsimsystems.com/exersizes.htm (retrieved on Jan. 14, 2014).

European Patent Office, The International Search Report and Written Opinion for International Application No. PCT/US2013/062269, mailed Feb. 17, 2014, entitled "Surgical Training Model for Transluminal Procedures."

European Patent Office, The International Search Report and Written Opinion for International Application No. PCT/US2013/061728 mailed Oct. 18, 2013, entitled "Surgical Training Model for Laparoscopic Procedures."

Limps and Things, EP Guildford MATTU Hernia Trainer, http://limbsandthings.com/us/products/tep-guildford-mattu-hernia-trainer/.

Simulab, Hernia Model, http://www.simulab.com/product/surgery/open/hernia model.

McGill Laparoscopic Inguinal Hernia Simulator, Novel Low-Cost Simulator for Laparoscopic Inguinal Hernia Repair.

University of Wisconsin-Madison Biomedical Engineering, Inguinal Hernia Model, http://bmedesign.engr.wisc.edu/projects/s10/hernia_model/.

European Patent Office, The International Search Report and Written Opinion of the International Searching Authority for International Application No. PCT/US2014/038195 titled "Hernia Model", mailed Oct. 15, 2014.

European Patent Office, The International Search Report and Written Opinion of the International Searching Authority for International Application No. PCT/US2014/048027 titled "First Entry Model", mailed Oct. 17, 2014.

European Patent Office, The International Search Report and Written Opinion for International Application No. PCT/US2014/019840 mailed Jul. 4, 2014 entitled "Advanced Surgical Simulation Constructions and Methods."

Kurashima Y et al, "A tool for training and evaluation of Laparoscopic inguinal hernia repair; the Global Operative Assessment of Laparoscopic Skills—Groin Hernia" American Journal of Surgery, Paul Hoeber, New York, NY, US vol. 201, No. 1, Jan. 1, 2011, pp. 54-61 XP027558745.

European Patent Office, International Search Report and Written Opinion for International Application No. PCT/US2013/053497 titled "Simulated Stapling and Energy Based Ligation for Surgical Training" dated Nov. 5, 2013.

European Patent Office, The International Search Report and Written Opinion for International Application No. PCT/US2014/042998, title; Gallbladder Model, mailed Jan. 7, 2015.

The International Bureau of WIPO, International Preliminary Report on Patentability, for PCT application No. PCT/US2013/053497, titled, Simulated Stapling and Energy Based Ligation for Surgical Training, mailed Feb. 12, 2015.

(56) References Cited

OTHER PUBLICATIONS

The International Bureau of WIPO, International Preliminary Report on Patentability for International Application No. PCT/US2013/062363, titled Surgical Training Model for Laparoscopic Procedures, mailed Apr. 9, 2015.

The International Bureau of WIPO, International Preliminary Report on Patentability for International Application No. PCT/US2013/062269, titled Surgical Training Model for Laparoscopic Procedures, mailed Apr. 9, 2015.

The International Bureau of WIPO, International Preliminary Report on Patentability for International Application No. PCT/US2013/061557, titled Surgical Training Model for Laparoscopic Procedures, mailed Apr. 9, 2015.

The International Bureau of WIPO, International Preliminary Report on Patentability for International Application No. PCT/US2013/061728, titled Surgical Training Model for Laparoscopic Procedures, mailed Apr. 9, 2015.

The International Bureau of WIPO, International Preliminary Report on Patentability for International Application No. PCT/US2013/061949, titled Surgical Training Model for Laparoscopic Procedures, mailed Apr. 9, 2015.

European Patent Office, The International Search Report and Written Opinion for International Application No. PCT/US2015/020574, titled "Advanced First Entry Model for Surgical Simulation," mailed Jun. 1, 2015.

European Patent Office, The International Search Report and Written Opinion for International Application No. PCT/US2015/022774, mailed Jun. 11, 2015 entitled "Simulated Dissectible Tissue."

Anonymous: Silicone rubber—from Wikipedia, the free encyclopedia, pp. 1-6, XP055192375, Retrieved from the Internet: URL:http://en.wikipedia.org/w.index.php?title=Silicone_rubber&oldid=596456058 (retrieved on May 29, 2015).

Lamouche, et al., "Review of tissue simulating phantoms with controllable optical, mechanical and structural properties for use in optical coherence tomography," Biomedical Optics Express, Jun. 1, 2012, 18 pgs., vol. 3, No. 6.

The International Bureau of WIPO, International Preliminary Report on Patentability for International Application No. PCT/US2014/038195, titled Hernia Model, mailed Nov. 26, 2015.

The International Bureau of WIPO, International Preliminary Report on Patentability for International Application No. PCT/US2014/042998, titled "Gallbladder Model" dated Dec. 30, 2015.

The International Bureau of WIPO, International Preliminary Report on Patentability for International Application No. PCT/US2014/048027, titled "First Entry Model" dated Feb. 4, 2016.

Society of Laparoendoscopic Surgeons, "Future Technology Session: The Edge of Innovation in Surgery, Space, and Business" http://www.laparoscopytoday.com/endourology/page/2/ , Figure 1B: http://laparoscopy.blogs.com/laparoscopy_today/images/6-1/6-1VlaovicPicB.jpg , Sep. 5-8, 2007, 10 pgs.

Miyazaki Enterprises, "Miya Model Pelvic Surgery Training Model and Video," www.miyazakienterprises, printed Jul. 1, 2016, 1 pg.

European Patent Office, International Search Report and Written Opinion for International Application No. PCT/US2015/059668 titled "Simulated Tissue Models and Methods" dated Apr. 26, 2016, 20 pgs.

Australian Patent Office, Patent Examination Report No. 1 for Australian Application No. 2012358851 titled "Advanced Surgical Simulation" dated May 26, 2016, 3 pgs.

European Patent Office, International Search Report and Written Opinion for International Application No. PCT/US2016/032292 titled "Synthetic Tissue Structures for Electrosurgical Training and Simulation," dated Jul. 14, 2016, 11 pgs.

European Patent Office, International Search Report and Written Opinion for International Application No. PCT/US2016/018697 titled "Simulated Tissue Structures and Methods," dated Jul. 14, 2016, 21 pgs.

European Patent Office, International Search Report and Written Opinion for International Application No. PCT/US2016/034591 titled "Surgical Training Model for Laparoscopic Procedures," dated Aug. 8, 2016, 18 pgs.

European Patent Office, The International Search Report and Written Opinion of the International Searching Authority for International Application No. PCT/US2016/036664 titled "Hysterectomy Model", mailed Aug. 19, 2016, 15 pgs.

3D-MED Corporation, "Validated Training Course for Laparoscopic Skills", https://www.3-dmed.com/sites/default/files/product-additional/product-spec/Validated%20Training%20Course%20for%20Laparoscopic%20Skills.docx_3.pdf , printed Aug. 23, 2016, pp. 1-6.

3D-MED Corporation, "Loops and Wire #1" https://www.3-dmed.com/product/loops-and-wire-1 , printed Aug. 23, 2016, 4 pgs.

Barrier, et al., "A Novel and Inexpensive Vaginal Hysterectomy Simulatory," Simulation in Healthcare: The Journal of the Society for Simulation in Healthcare, vol. 7, No. 6, Dec. 1, 2012, pp. 374-379.

The International Bureau of WIPO, International Preliminary Report on Patentability for International Application No. PCT/US2015/020574, entitled "Advanced First Entry Model for Surgical Simulation," dated Sep. 22, 2016, 9 pgs.

European Patent Office, The International Search Report and Written Opinion of the International Searching Authority for International Application No. PCT/US2016/0043277 titled "Appendectomy Model", mailed Oct. 4, 2016, 12 pgs.

The International Bureau of WIPO, International Preliminary Report on Patentability for International Application No. PCT/US2015/022774, titled "Simulated Dissectible Tissue," dated Oct. 6, 2016, 9 pgs.

European Patent Office, The International Search Report and Written Opinion of the International Searching Authority for International Application No. PCT/US2016/041852 titled "Simulated Dissectible Tissue", mailed Oct. 13, 2016, 12 pgs.

European Patent Office, Invitation to Pay Additional Fees for International Application No. PCT/US2016/062669, titled "Simulated Dissectible Tissue", mailed Feb. 10, 2017, 8 pgs.

European Patent Office, The International Search Report and Written Opinion of the International Searching Authority for International Application No. PCT/US2016/055148 titled "Hysterectomy Model", mailed Feb. 28, 2017, 12 pgs.

European Patent Office, Examination Report for European Application No. 14733949.3 titled "Gallbladder Model," mailed Dec. 21, 2016, 6 pgs.

European Patent Office, The International Search Report and Written Opinion of the International Searching Authority for International Application No. PCT/US2016/062669 titled "Simulated Dissectible Tissue," mailed Apr. 5, 2017, 19 pgs.

European Patent Office, The International Search Report and Written Opinion of the International Searching Authority for International Application No. PCT/US2017/020389 titled "Simulated Tissue Cartridge", mailed May 24, 2017, 13 pgs.

The International Bureau of WIPO, International Preliminary Report on Patentability and Written Opinion for International Application No. PCT/US2015/059668, entitled "Simulated Tissue Models and Methods," dated May 26, 2017, 16 pgs.

The International Bureau of WIPO, International Preliminary Report on Patentability for International Application No. PCT/US2016/018697, entitled "Simulated Tissue Structures and Methods," dated Aug. 31, 2017, 14 pgs.

The International Bureau of WIPO, International Preliminary Report on Patentability for International Application No. PCT/US2016/0032292, entitled "Synthetic Tissue Structures for Electrosurgical Training and Simulation," dated Nov. 23, 2017, 2017, 8 pgs.

The International Bureau of WIPO, International Preliminary Report on Patentability for International Application No. PCT/US2016/034591, entitled "Surgical Training Model for Laparoscopic Procedures," dated Dec. 7, 2017, 2017, 14 pgs.

The International Bureau of WIPO, International Preliminary Report on Patentability for International Application No. PCT/US2016/036664, entitled "Hysterectomy Model," dated Dec. 21, 2017, 10 pgs.

(56) References Cited

OTHER PUBLICATIONS

The International Bureau of WIPO, International Preliminary Report on Patentability for International Application No. PCT/US2016/041852, entitled "Simulated Dissectible Tissue," dated Jan. 25, 2018, 12 pgs.

European Patent Office, Extended European Search Report for European Patent Application No. EP 17202365.7, titled "Gallbladder Model", dated Jan. 31, 2018, 8 pgs.

The International Bureau of WIPO, International Preliminary Report on Patentability for International Application No. PCT/US2016/043277, entitled "Appendectomy Model," dated Feb. 1, 2018, 9 pgs.

The International Bureau of WIPO, International Preliminary Report on Patentability for International Application No. PCT/US2016/055148, entitled "Hysterectomy Model," dated Apr. 12, 2018, 12 pgs.

European Patent Office, The International Search Report and Written Opinion for International Application No. PCT/US2017/039113, entitled "Simulated Abdominal Wall," mailed Aug. 7, 2017, 13 pgs.

European Patent Office, The International Search Report and Written Opinion for International Application No. PCT/US2018/018895, entitled "Synthetic Tissue Structures for Electrosurgical Training and Simulation," mailed May 17, 2018, 12 pgs.

The International Bureau of WIPO, International Preliminary Report on Patentability for International Application No. PCT/US2016/062669, entitled "Simulated Dissectible Tissue," dated May 31, 2018, 11 pgs.

European Patent Office, The International Search Report and Written Opinion for International Application No. PCT/US2018/018036, entitled "Laparoscopic Training System," mailed Jun. 8, 2018, 13 pgs.

European Patent Office, Extended European Search Report for European Patent Application No. EP 18177751.7, titled "Portable Laparoscopic Trainer," dated Jul. 13, 2018, 8 pgs.

European Patent Office, The International Search Report and Written Opinion for International Application No. PCT/US2018/034705, entitled "Laparoscopic Training System," mailed Aug. 20, 2018, 14 pgs.

The International Bureau of WIPO, International Preliminary Report on Patentability for International Application No. PCT/US2017/020389, entitled "Simulated Tissue Cartridge," dated Sep. 13, 2018, 8 pgs.

European Patent Office, Extended European Search Report for European Patent Application No. EP 18184147.9, titled "First Entry Model," dated Nov. 7, 2018, 7 pgs.

The International Bureau of WIPO, International Preliminary Report on Patentability for International Application No. PCT/US2017/039113, entitled "Simulated Abdominal Wall," dated Jan. 10, 2019, 8 pgs.

European Patent Office, Extended European Search Report for European Patent Application No. EP 18210006.5, titled "Surgical Training Model for Laparoscopic Procedures," dated Jan. 21, 2019, 7 pgs.

European Patent Office, Extended European Search Report for European Patent Application No. EP 18207214.0, titled "Synthetic Tissue Structures for Electrosurgical Training and Simulation," dated Mar. 28, 2019, 6 pgs.

European Patent Office, Extended European Search Report for European Patent Application No. EP 18216002.8, titled "Surgical Training Model for Laparoscopic Procedures," dated Apr. 2, 2019, 6 pgs.

European Patent Office, Extended European Search Report for European Patent Application No. EP 18216005.1, titled "Surgical Training Model for Laparoscopic Procedures," dated Apr. 2, 2019, 7 pgs.

European Patent Office, Extended European Search Report for European Patent Application No. EP 19159065.2, titled "Simulated Tissue Structures and Methods," dated May 29, 2019, 8 pgs.

The International Bureau of WIPO, International Preliminary Report on Patentability for International Application No. PCT/US2018/018036, entitled "Laparoscopic Training System," dated Aug. 29, 2019, 8 pgs.

The International Bureau of WIPO, International Preliminary Report on Patentability for International Application No. PCT/US2018/018895, entitled "Synthetic Tissue Structures for Electrosurgical Training and Simulation," dated Sep. 6, 2019, 7 pgs.

European Patent Office, Extended European Search Report for European Patent Application No. EP 20153338.7, titled "Advanced Surgical Simulation Constructions and Methods," dated Mar. 5, 2020, 7 pgs.

European Patent Office, Extended European Search Report for European Patent Application No. EP 19215545.5, titled "Advanced First Entry Model for Surgical Simulation," dated Mar. 26, 2020, 8 pgs.

European Patent Office, Extended European Search Report for European Patent Application No. EP 20158500.7, titled "Surgical Training Device," dated May 14, 2020, 9 pgs.

"Surgical Female Pelvic Trainer (SFPT) with Advanced Surgical Uterus," Limbs & Things Limited, Issue 1, Jul. 31, 2003, URL:https://www.accuratesolutions.it/wp-content/uploads/2012/08/Surgical_Female_Pelvic_Trainer_SFPT_with_Advanced_Uterus_User_Guide.pdf, retrieved Feb. 21, 2020, 2 pgs.

European Patent Office, Extended European Search Report for European Patent Application No. EP 20186713.2, titled "Simulated Dissectible Tissue," dated Nov. 10, 2020, 12 pgs.

European Patent Office, Extended European Search Report for European Patent Application No. 21159294.4, titled "Surgical Training Model for Laparoscopic Procedures," dated May 4, 2021, 7 pgs.

Condino et al.; "How to build patient-specific synthetic abdominal anatomies. An innovative approach from physical toward hybrid surgical simulators," The International Journal of Medical Robotics and Computer Assisted Surgery, Apr. 27, 2011, vol. 7, No. 2, pp. 202-213.

Wilkes et al.; "Closed Incision Management with Negative Pressure Wound Therapy (CIM): Biomechanics," Surgical Innovation 19(1), URL:https://journals.sagepub.com/doi/pdf/10.1177/1553350611414920, Jan. 1, 2012, pp. 67-75.

European Patent Office, Extended European Search Report for European Patent Application No. EP 21182654.0, titled "Simulated Dissectible Tissue," dated Oct. 22, 2021, 13 pgs.

European Patent Office, Extended European Search Report for European Patent Application No. EP 21191452.8, titled "Advanced Surgical Simulation Constructions and Methods," dated Dec. 13, 2021, 8 pgs.

European Patent Office, Extended European Search Report for European Patent Application No. EP 22151452.4, titled "Portable Laparoscopic Trainer," dated Apr. 13, 2022, 8 pgs.

European Patent Office, Extended European Search Report for European Patent Application No. EP 22172093.1, titled "Hysterectomy Model," dated Jul. 20, 2022, 9 pgs.

European Patent Office, Extended European Search Report for European Patent Application No. 22212824.1, titled "Surgical Training Model for Laparoscopic Procedures," dated Feb. 28, 2023, 20 pgs.

European Patent Office, Extended European Search Report for European Patent Application No. 22214865.2, titled "Gallbladder Model," dated Feb. 28, 2023, 18 pgs.

European Patent Office, Partial Extended European Search Report for European Patent Application No. 23180886.6, titled "Simulated Dissectible Tissue," dated Sep. 20, 2023, 16 pgs.

European Patent Office, Extended European Search Report for European Patent Application No. 23200455.6, titled "Simulated Training Model for Laparoscopic Procedures," dated Dec. 4, 2023, 7 pgs.

* cited by examiner

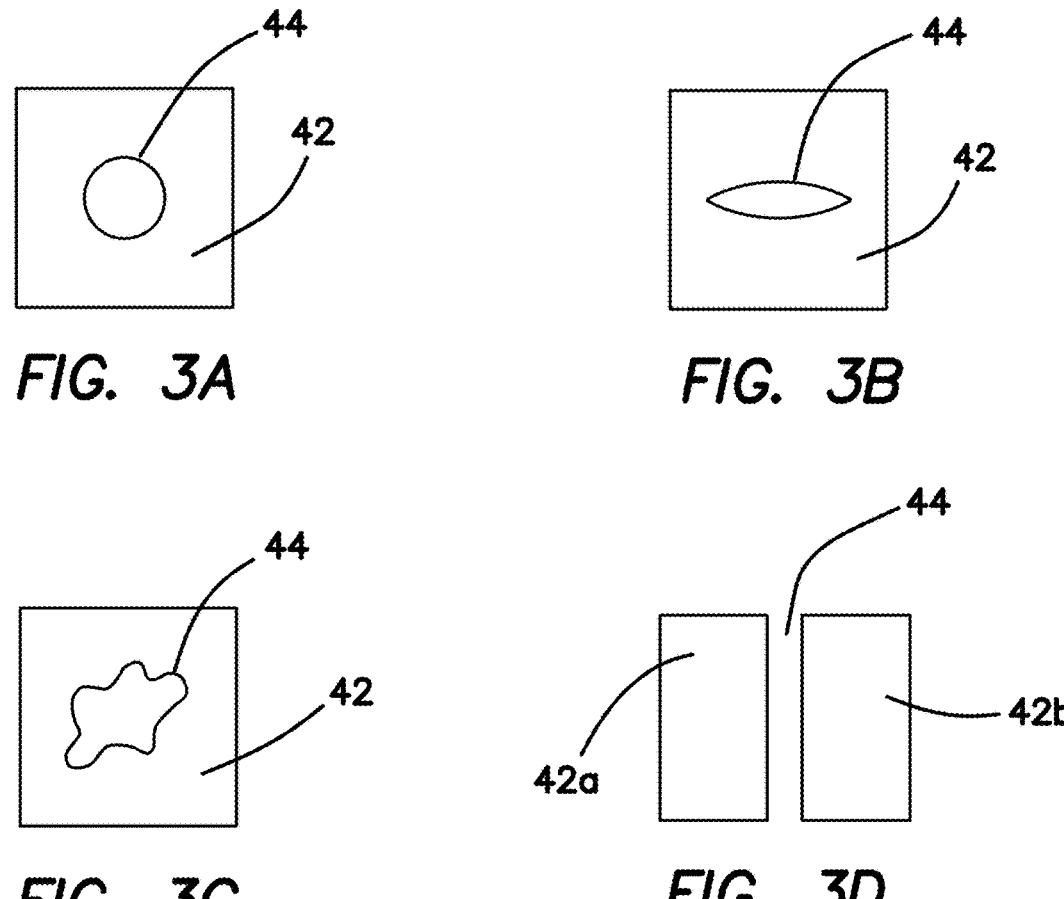
FIG.  3A          FIG.  3B
FIG.  3C          FIG.  3D
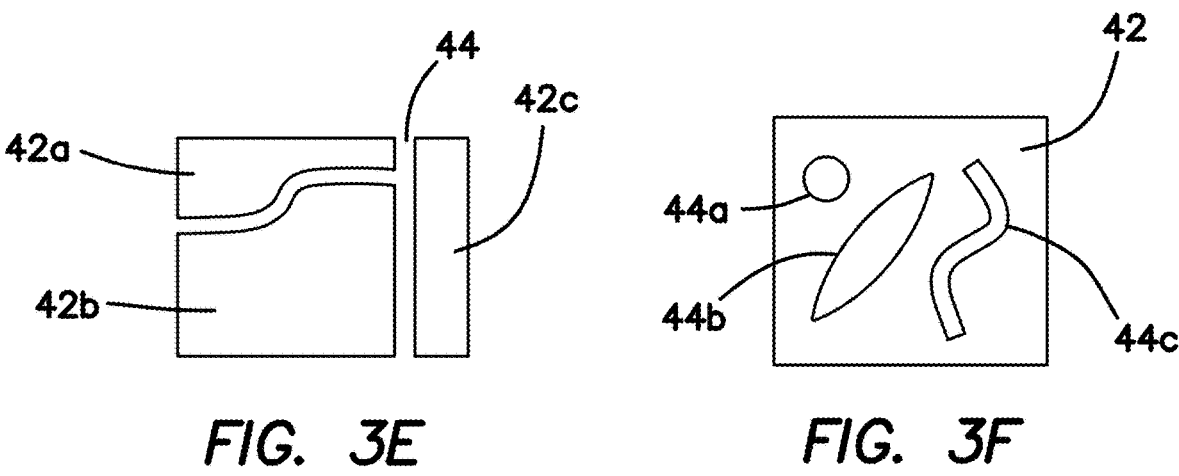
FIG.  3E          FIG.  3F

SIMULATED TISSUE STRUCTURE FOR SURGICAL TRAINING

CROSS-REFERENCE TO RELATED APPLICATION

This application is a continuation of U.S. patent application Ser. No. 17/510,655 entitled "Simulated tissue structure for surgical training" filed on Oct. 26, 2021 which is a continuation of U.S. patent application Ser. No. 14/940,444 entitled "Simulated tissue structure for surgical training" filed on Nov. 13, 2015, now issued as U.S. Pat. No. 11,158,212, which is a continuation of U.S. patent application Ser. No. 13/656,467 entitled "Simulated tissue structure for surgical training" filed on Oct. 19, 2012, now issued as U.S. Pat. No. 9,218,753, which claims priority to and benefit of U.S. Provisional Patent Application Ser. No. 61/549,838 entitled "Simulated tissue structure for surgical training" filed on Oct. 21, 2011 all of which are incorporated herein by reference in their entireties.

FIELD

This application is generally related to surgical training tools, and in particular, to anatomical models simulating organs or tissue for teaching and practicing various surgical techniques and procedures.

BACKGROUND

Medical students as well as experienced doctors learning new surgical techniques must undergo extensive training before they are qualified to perform surgery on human patients. The training must teach proper techniques employing various medical devices for cutting, penetrating, clamping, grasping, stapling and suturing a variety of tissue types. The range of possibilities that a trainee may encounter is great. For example, different organs and patient anatomies and diseases are presented. The thickness and consistency of the various tissue layers will also vary from one part of the body to the next and from one patient to another. Accordingly, the skills required of the techniques and instruments will also vary. Furthermore, the trainee must practice techniques in readily accessible open surgical locations and in locations accessed laparoscopically.

Numerous teaching aids, trainers, simulators and model organs are available for one or more aspects of surgical training. However, there is a need for model organs or simulated tissue elements that are likely to be encountered in endoscopic, laparoscopic, transanal, minimally invasive or other surgical procedures that include the removal of tumors or other tissue structures. In particular, there is a need for realistic model organs for the repeatable practice of removing a tumor or other undesired tissue followed by the closure of the target area by suturing or stapling as part of the same surgical procedure. In view of the above, it is an object of this invention to provide a surgical training device that realistically simulates such particular circumstances encountered during surgery.

SUMMARY

According to one aspect of the invention, a simulated tissue structure for surgical training is provided. The structure includes a defect layer located above the base layer. The defect layer includes at least one defect having two opposed surfaces that define at least one gap between the surfaces. A simulated tumor is located above the defect layer in such a way to overlay at least a portion of the defect. A cover layer is located above the base layer and overlays the tumor.

According to another aspect of the invention, a simulated tissue structure for surgical training is provided. The simulated tissue structure includes at least one simulated tissue module comprising a simulated tissue portion. The structure includes a module support having a first surface opposite from a second surface and defining a thickness therebetween. The module support includes at least one module receiving portion sized and configured to receive and connect with the at least one simulated tissue module. The simulated tissue module is insertable into and removable from the at least one module receiving portion and interchangeable with another simulated tissue module.

According to another aspect of the invention a method for surgical training is provided. The method includes the step of providing a simulated tissue structure comprising an artificial tumor located between a base layer and a cover layer. The base layer and the cover layer are made of elastomeric polymer that may include mesh reinforcement. The simulated tissue structure is placed inside a simulated body cavity of a surgical training device such that the simulated tissue structure is at least partially obscured from view by a user. The user removes the artificial tumor from the simulated tissue structure with instruments passed into the simulated body cavity with the simulated tissue structure obscured from the user and visualized on a video monitor providing a live feed of the simulated tissue structure inside the cavity via a laparoscope or endoscope. At least one defect is created substantially in the location of the tumor. The defect comprises two adjacent surfaces defining a gap. The gap is closed by bringing the two adjacent surfaces together with instruments such as sutures, staples, adhesive or other surgical means. Suturing the gap to bring the two adjacent surfaces together. In one variation, creating a defect includes providing a defect layer in the simulated tissue structure. Providing a defect layer includes providing a defect layer with a pre-formed defect or gap and placing the defect layer such that the defect layer is between the base layer and the cover layer and at least a portion of the defect is located underneath the artificial tumor. In another variation, creating a defect includes cutting at least one of the base layer and cover layer. Removing the artificial tumor from the simulated tissue structure includes removing the artificial tumor through the defect created by cutting.

BRIEF DESCRIPTION OF THE DRAWINGS

FIG. 3A illustrates a top view of a defect layer having a circular shaped defect according to the present invention.

FIG. 3B illustrates a top view of a defect layer having an elongated defect according to the present invention.

FIG. 3C illustrates a top view of a defect layer having an amorphous defect according to the present invention.

FIG. 3D illustrates a top view of a defect layer having a two-piece defect according to the present invention.

FIG. 3E illustrates a top view of a multi-part defect layer according to the present invention.

FIG. 3F illustrates a top view of a defect layer having multiple defects according to the present invention.

DETAILED DESCRIPTION

Figure 1:
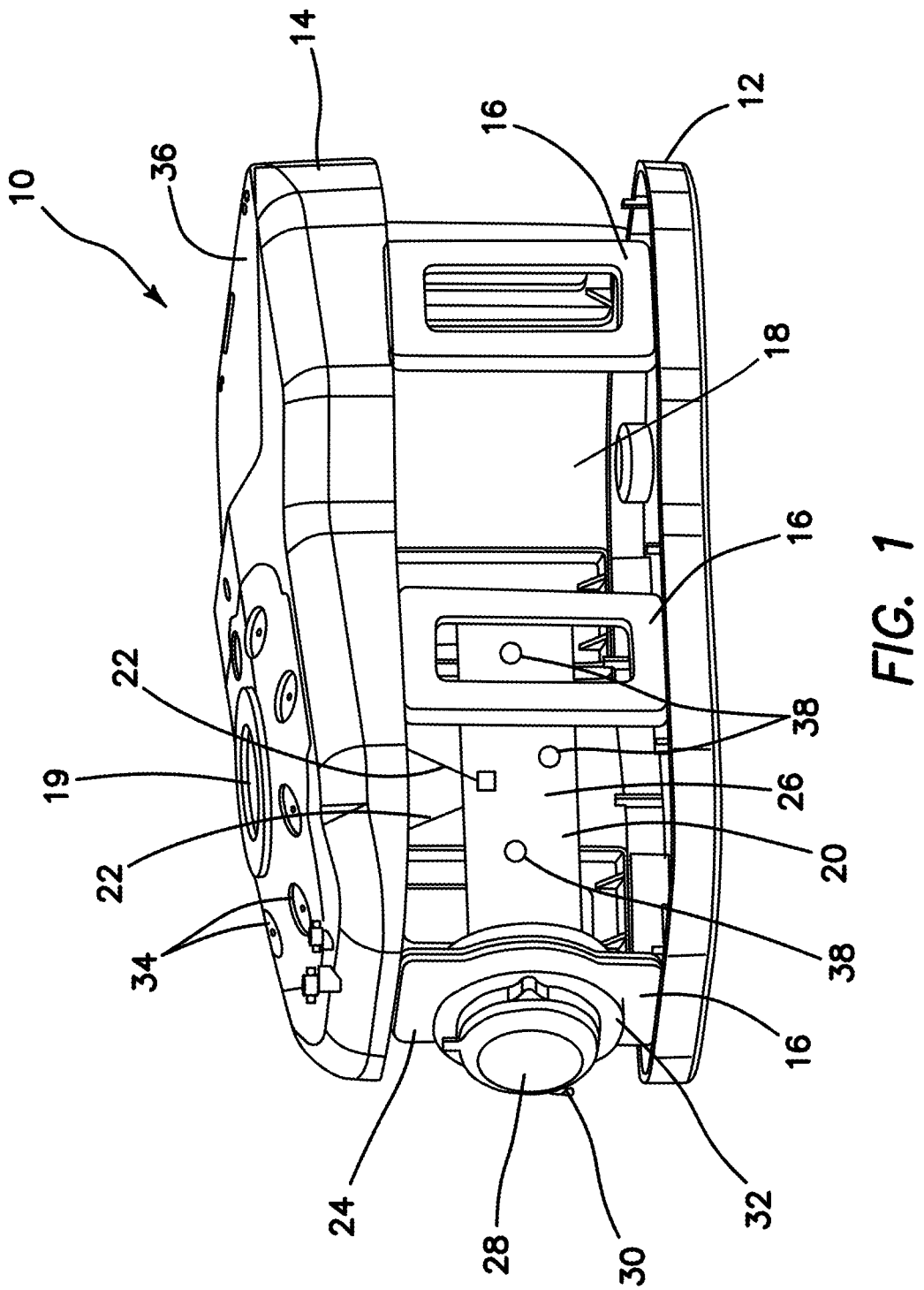
FIG. 1 illustrates a side view of a surgical training device with a model organ according to the present invention.

A surgical training device 10 that is configured to mimic the torso of a patient such as the abdominal region is shown in FIG. 1. The surgical training device 10 provides a simulated body cavity 18 substantially obscured from the user for receiving model organs or simulated or live tissue 20. The body cavity 18 is accessed via a tissue simulation region 19 that is penetrated by the user employing devices to practice surgical techniques on the tissue or organ 20 found located in the body cavity 18. Although the body cavity 18 is shown to be accessible through a tissue simulation region 19, a hand-assisted access device or single-site port device may be alternatively employed to access the body cavity 18 as described in U.S. patent application Ser. No. 13/248,449 entitled "Portable Laparoscopic Trainer" filed on Sep. 29, 2011 and incorporated herein by reference in its entirety. The surgical training device 10 is particularly well suited for practicing laparoscopic or other minimally invasive surgical procedures.

The surgical training device 10 includes a base 12 and a top cover 14 connected to and spaced apart from the base 12 to define an internal body cavity 18 between the top cover 14 and the base 12. At least one leg 16 interconnects and spaces apart the top cover 14 and base 12. A model organ or simulated tissue 20 is disposed within the body cavity 18. The model organ 20 shown in FIG. 1 is a partial colon or intestine that is shown suspended from the top cover 14 by tethers 22 and connected to at least one leg 24. The at least one leg 24 has an aperture (not shown) facing the internal body cavity 18. The model colon 20 includes a tube 26 having a proximal end and a distal end. The proximal end of the tube 26 is interconnected with the aperture of the leg 16 such that the aperture provides an access port to the lumen of the tube 26. The access port and aperture is shown to be closed off in FIG. 1 with an access device 28 which in combination with a sealed distal end of the tube 26 provides a model organ 20 that is adapted for insufflation with fluid deliverable via an insufflation port 30. An optional insert 32 made of soft material such as silicone creates a realistic interface for the access port. The distal end of the tube 26 extends into the body cavity 18 and is suspended within the body cavity 18. The interior of the tube 26 of the simulated organ 20 is accessible via the access port of leg 24 or via the tissue simulation region 19 or instrument insertion ports 34. An endoscopic camera inserted into the body cavity 18 or into the organ 20 via the access port generates a live image for display on a fold out video screen 36 shown in the closed position in FIG. 1. Although the simulated organ 20 of FIG. 1 is ideal for practicing procedures related to transanal minimally invasive surgery, any simulated organ or tissue portion may be employed. One particular aspect of the organ 20 is at least one tumor or defect 38 is provided and connected to the organ. As shown in FIG. 1, the tumor 38 is connected to the wall of the organ tube 26.

Figures 2A, 2B, 2C, 2D:
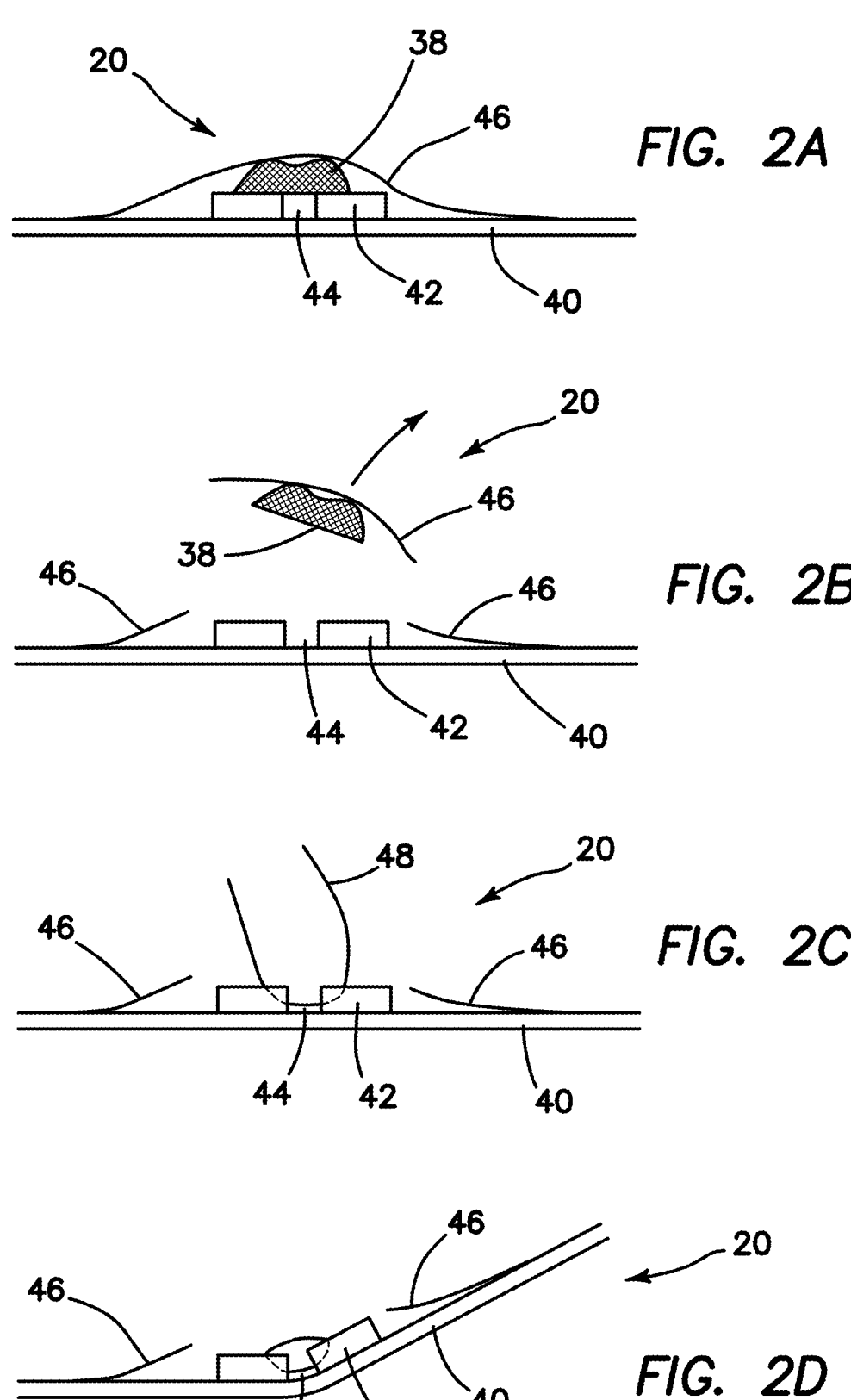
FIG. 2A illustrates a side cross-sectional view of a simulated tissue structure according to the present invention.
FIG. 2B illustrates a side cross-sectional view of a simulated tissue structure with tumor excised according to the present invention.
FIG. 2C illustrates a side cross-sectional view of a simulated tissue structure with an open suture according to the present invention.
FIG. 2D illustrates a side cross-sectional view of a simulated tissue structure with a closed suture according to the present invention.

Turning now to FIG. 2A there is shown a partial side cross-sectional view of a portion of a simulated organ 20 that includes the tumor 38. The simulated organ or tissue 20 includes a base layer or organ wall 40. The organ wall 40 is made from a material configured to mimic real live tissue such as silicone or other polymer and is dyed appropriately. One or more base layers 40 of varying thicknesses and colorations may be employed to comprise the entirety of the wall 40. In one variation, the organ wall 40 is rigid and made of polymeric material. Above the base layer 40 is a second layer or defect layer 42. The defect layer 42 is the same size or smaller than the base layer 40 forming a raised platform for the tumor 38. The defect layer 42 is connected to the base layer 40 by adhesive or other means known to one having ordinary skill in the art including being integrally formed with the base layer 40 as a single unit. The defect layer 42 is made of silicone and in one variation of the same color as the base layer 40 such that the defect layer 42 blends into the background of the base layer 40. The defect layer 42 includes at least one defect or gap 44. In one variation, the defect 44 is a pre-fabricated breach in the defect layer 42 that mimics an incision, gap or other void in real tissue resulting from a tear, cut, removal or other surgical procedure that requires surgical attention by way of suturing, stapling or the like to close the defect. Such a situation arises most often in the removal of a tumor 38 where surrounding tissue is also removed together with the tumor 38 to preventatively ensure the entirety of the tumor is excised leaving behind a remnant defect in the tissue. The defect 44 comprises two opposed sides or surfaces defining a gap therebetween. Although the adjacent sides or surfaces are shown to be vertical with respect to the base layer 40, the invention is not so limited and the juxtaposed surfaces or sides can have any shape and, for example, be curved. The defect 44 can be any shape as will be discussed with respect to FIGS. 3A-3F.

Turning now to FIG. 3A, there is shown a top view of a defect layer 42 having a circular defect 44. A defect layer 42 with an elongated, oblong or elliptically shaped defect 44 is shown in the FIG. 3B. The defect 44 can be amorphic or any shape as shown in FIG. 3C. The defect layer 42 may be multi-part as shown in FIG. 3D wherein the defect layer 42 includes two or more adjacent defect layer pieces 42a, 42b juxtaposed to create at least one defect 44 therebetween. Another multi-part defect layer 42 is shown in FIG. 3E where a plurality of adjacent defect layer pieces 42a, 42b and 42c form one or more defects 44 therebetween. Of course, a defect layer 42 may include multiple defects 44a, 44b and 44c as shown in FIG. 3F. The defects 44 may all be the same or have different shapes as shown in FIG. 3F. The shape, thickness and size of the defect allow the surgeon trainee to practice suturing across defects of varying difficulty. In one variation, the defect layer 42 is not of equal thickness. Instead, the thickness of the defect layer 42 varies at the defect 44 location to increase the difficulty of suturing or closing the defect.

Referring back to FIG. 2A, a tumor 38 is located above the defect layer 42. The tumor 38 is preferably a different color from the base layer 40 or defect layer 42 or both such that it is readily identifiable by the trainee. Preferably, the tumor 38 is made of silicone or other polymer material and is red, black, blue or dark brown in color. In general, the tumor 38 is of a darker color than the base or defect layers 40, 42 or otherwise in contrast therewith when viewed through a scope. In one variation, the tumor 38 is connected to the defect layer 42 by adhesive or other means known to one of ordinary skill in the art. In another variation, the tumor 38 is not connected or attached to the defect layer 42 but is removably located thereon.

Figure 4:
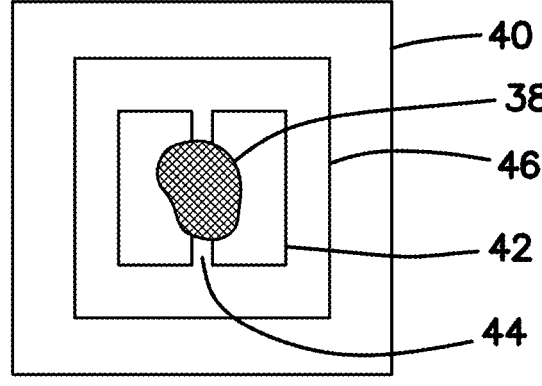
FIG. 4 illustrates a top view of a simulated tissue structure according to the present invention.

Still referencing FIG. 2A, the simulated tissue structure 20 includes a cover layer 46 located above the tumor 38. In one variation, the cover layer 46 overlays the tumor 38, defect layer 42 and the base layer 40. The cover layer 46 is preferably transparent or translucent in color and made of a polymer material such as silicone. In another variation, the cover layer 46 is the same color as the base layer 40 or defect layer 42. The cover layer 46 is at least as thick as the base layer 40 or defect layer 42 and in one variation is thinner than the defect layer 42 and in another variation is thinner than the base layer 40. The cover layer 46 is sized to cover the entire tumor 38 and defect layer 42 and is big enough to contact the base layer 40 in one variation. In another variation, the cover layer 46 is sized to cover the entire tumor 38 and contact the defect layer 40. The cover layer 46 is connected to the base layer 40, defect layer 42, tumor 38 or any more than one of the three layers by way of adhesive or other means known to one of ordinary skill in the art. In another variation, the cover layer 46 is smaller and connected to the defect layer 42 alone. In yet another variation, the cover layer 46 is connected to both the defect layer 42 and base layer 42 by adhesive or other means known to one of ordinary skill in the art. The cover layer 46 can be any shape or sized and be configured to provide a smooth surface to the surgeon instead of a layered surface to the artificial tumor location. The cover layer 46, tumor 38, defect layer 42 or base layer 40 includes surface texturing in one variation. Also, the cover layer 46 assists in keeping the tumor 38 and defect layer 42 sandwiched between the cover layer 46 and base layer 40 which is advantageous in a variation wherein the tumor 38 is not adhered to the defect layer 42. A top planar view of the base layer 40, defect layer 42, cover layer 46 and tumor 38 is shown in FIG. 4. In one variation, any one or more of the base layer 40, defect layer 42 and cover layer 46 is formed of silicone molded over a woven, fabric, or mesh material such as nylon or cheesecloth so that the silicone layer has an integrated mesh structural support or other type of reinforcement. Any one or more of the layers 38, 40, 42, 46 can include a fabric or mesh reinforcement combined with an elastic polymer such silicone. The mesh support aids in preventing the suture, staple, or suture needle from tearing through at least one of layers and especially the defect layer 42 when the suture is pulled to close the gap 44.

In FIG. 2B, the tumor 38 and a portion of the cover layer 46 are shown excised from the base layer 40. The excision is performed by the trainee using a surgical instrument such as a scalpel or other medical instrument to remove the tumor 38. The trainee will cut through the cover layer 46 around the tumor 38, isolate the tumor 38, lift and remove the tumor 38 away from the site to expose the underlying defect 44 as shown in FIG. 2B. Then, as shown in FIG. 2C the trainee sutures the defect 44 using a surgical suture 48 bringing the lips or edges of the defect layer 42 together as shown in FIG. 2D, thereby, practicing the closing of a gap or wound created by the surgical removal of a tumor 38. Cutting the at least one layer to create an opening and removing the artificial tumor and suturing the gap is performed while the simulated tissue structure is disposed inside a simulated body cavity 18 of a surgical training device such that the simulated tissue structure is at least partially obscured from view by the user.

Figure 5:
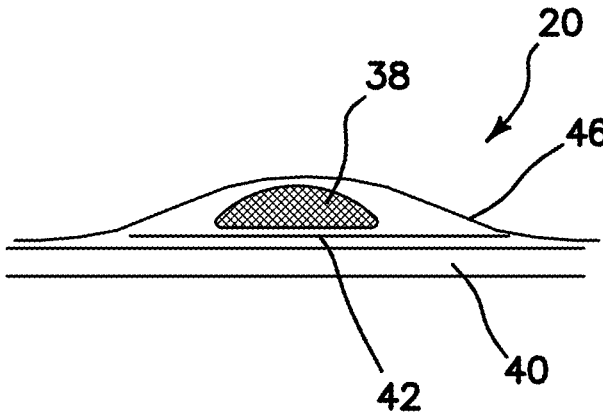
FIG. 5 illustrates a side cross-sectional view of a simulated tissue structure according to the present invention.

Turning now to FIG. 5, there is shown another variation in which there is no pre-formed gap or defect in the second or defect layer 42. Instead, upon excising the tumor 38, the defect is created by the user in one or more of the cover layer 46, defect layer 42, base layer 40 and any remaining tumor portion not removed by the user. The user would then practice suturing the created defect in any of these layers 38, 40, 42, 46. In one such variation, one of the defect layer 42 or base layer 40 is omitted from the construct. In another variation, the tumor 38 is located on a base layer 40 and the defect layer 42 is placed over the tumor 38 such that the defect layer 42 is above the tumor 38. In such a variation, a cover layer 46 may or may not be included. If a cover layer 46 is included it may be integrally formed together with the defect layer as a separate unitary layer. In any of the constructs described above with respect to FIGS. 2-5, the constructs may be flipped upside down or otherwise the layers placed in reverse or otherwise the construct being approachable by the user from either the top or bottom direction with the thicknesses and colors of the layers being adjusted accordingly if necessary to provide the simulated effects of real tissue.

Figures 6A, 6B:
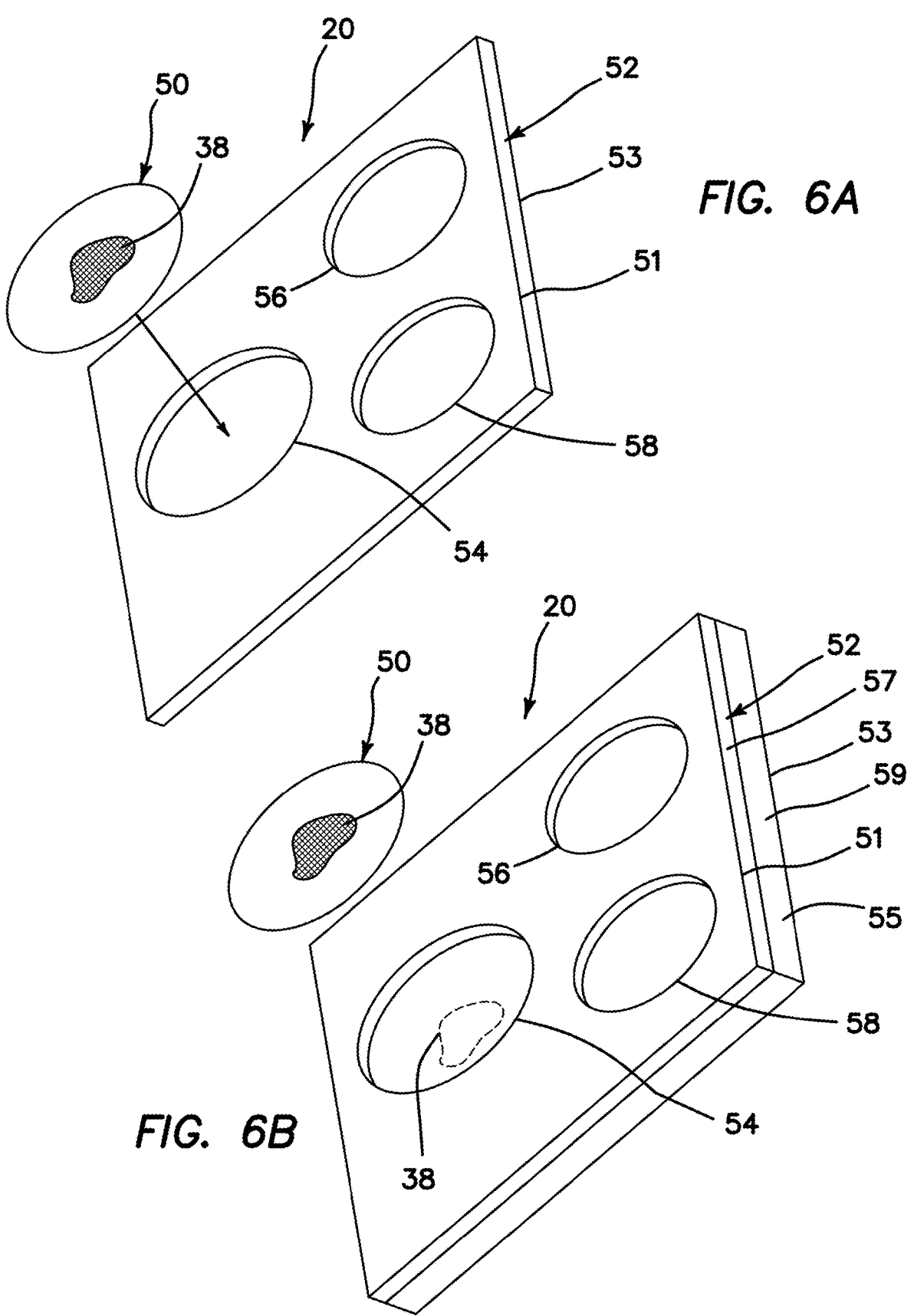
FIG. 6A illustrates a perspective view of a modular tissue structure and support according to the present invention.
FIG. 6B illustrates a perspective view of a modular tissue structure and support according to the present invention.

Turning now to FIGS. 6A and 6B, in any of the variations in this description, the simulated tissue construct can be modular such that it is not integrally formed with the entire simulated organ 20 but instead configured as a module 50 that is removable and interchangeable. One or more modules 50 are supported or contained in a module support 52. A module support 52 includes a first surface 51, a second surface 53 and one or more tumor module receiving portions 54, 56, 58 formed in the support 52. The tumor support 52 can be rigid or pliable and made of polymeric material. The tumor support 52 may also comprise a sheet of elastomeric material. The module receiving portions 54, 56, 58 are each sized and configured to receive a correspondingly sized and configured module 50. The modules 50 and module receiving portions 54, 56, 48 in FIG. 6 are shown to be circular; however, the tumor module 50 can be any shape with a complementary shaped receiving portion formed in the module support 52. The thickness of the support 52 can vary providing the construct with varying depths of tumor module 50 positioning. The module receiving portions 54, 56, 58 may include bottom walls onto which the tumor modules 50 may rest. Alternatively, the tumor receiving portions 54, 56, 58 extend between openings in the first surface 51 and the second surface 53 with the modules 50 with tumor 38 being connected between or at one of the openings at either surface 51, 53 or suspended within the tumor receiving portion. In one variation, a single tumor module 50 includes one or more tumors 38. The module support 52 is loaded with one or more tumor modules 50 and the simulated tissue construct 20 is inserted into the body cavity 18 of the surgical training device 10, framework or other torso model. It can be placed on the base 12 of the training device 10 or suspended within the body cavity 18 of the training device 10. The simulated tissue construct 20 and/or training device is fashioned with attachment mechanisms such as clips, fasteners, wires, hook-and-loop type fasteners and the like for placement, suspension or connection of the simulated tissue construct 20 to a training device 10.

With particular reference to FIG. 6B, there is shown a module support 52 that includes more than one layer. The module support 52 of FIG. 6B includes a first layer 57 connected to a second layer 55. In one variation, the first layer 57 is made of a sheet of elastomeric material and the second layer 55 is made of any suitable polymeric material such as low-density elastomeric foam. The second layer 55 serves as a support for the first layer 57. The second layer 55 also advantageously provides depth to the module support 52 permitting the tumors 38 within the modules 50 to be placed deeply into the module support 52 relative to the first surface 51. Module receiving portions 54, 56, 58 are formed in one or more than one of the first layer 57 and the second layer 55. Module receiving portions 54, 56, 58 formed in the second layer 55 may have a different shape than the shape the same module receiving portion 54, 56, 58 has in the first layer 57. In one variation, the tumor module 50 comprises at least only the simulated tumor 38 which is embedded or buried inside the second layer 55 with at least one of the first layer 57 or second layer 55 constituting a defect layer which the user can practice closing. As an alternative, the first layer 57 does not include a module receiving portion but instead the first layer 57 serves as a cover layer which the user practices cutting through to access the tumor 38 located in a tumor receiving portion formed in the second layer 55. In such variation, the first layer 57 can be a sheet of elastomeric material such as silicone and the second layer 55 is a layer of low-density elastomeric foam. The module support 52 is planar as shown in FIGS. 6A and 6B or, alternatively, shaped to mimic a portion of the human anatomy, tissue or organ.

Figure 7:
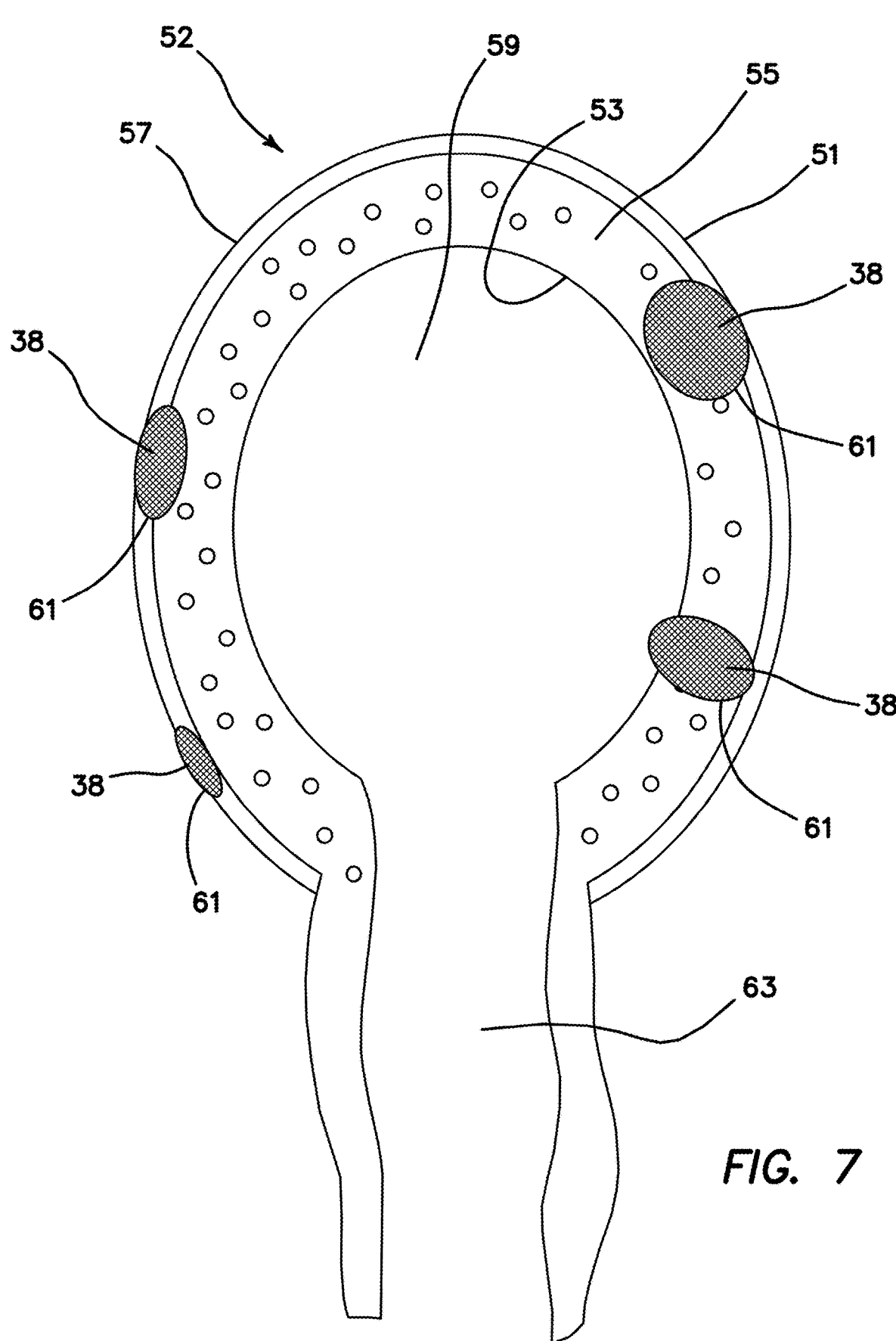
FIG. 7 illustrates a cross-sectional view of a simulated tissue structure configured to mimic a human uterus according to the present invention.

For example, FIG. 7 illustrates a support 52 that is shaped to mimic a human uterus. The support 52 includes a first layer 57 connected to a second layer 55. In one variation, the first layer 57 is made of any suitable polymeric material such as a sheet of elastomeric material and the second layer 55 is made of any suitable polymeric material such as a low-density elastomeric foam. The second layer 55 serves as a support for the first layer 57 and advantageously permits the tumors 38 within the modules 50 or the tumors 38 by themselves to be connected to the support 52 and realistically extend deeply into the support 52 and be dispersed throughout the support 52 in various locations and orientations including being embedded into the first layer 57 as shown in FIG. 7. Tumor or module receiving portions 61 are formed in at least one of the first layer 57 and second layer 55. The tumor receiving portions 61 may be pockets that are preformed in the second layer 55 or can be formed by the user by cutting slits into the second layer 55. In one variation, the tumors 38 are configured to mimic fibroid tumors commonly found in the human uterus. Examples of fibroid tumors that are simulated by the tumors 38 disposed in the support include but are not limited to one or more of the following types of fibroids: pedunculated submucosal fibroids, subserosal fibroids, submucosal fibroids, pedunculated subserosal fibroids and intramural fibroids. The user can approach the support 52 to excise the simulated tumors 38 from the first surface 51 or the second surface 53 via the access channel or opening 63. In one variation, the opening 63 serves as the only opening to the hollow portion 59 or alternatively the support 52 can have a substantially C-shaped planar configuration with access available to the user from above or below the planar C-shaped structure.

In one variation, the module support 52 in any of the variations is not planar but is provided with a landscape that includes curves and other structures, mountains and valleys and various textures. The varying landscape provides the user with various levels of difficulty in approaching each tumor location requiring the user to navigate around artifacts and features that may obscure the tumor location. These structural artifacts in the tumor support 52 may be integrally formed with the tumor support 52 or also be modular in structure similar to the tumor modules 50 making the anatomy landscape modules removable and interchangeable. Tumor modules 50 are interchangeable with non-tumor modules that include, for example, features and artifacts or textures made of silicone or other material extending outwardly or inwardly from the one or more of the upper and lower surfaces 51, 53 of the module support 52. The features in such non-tumor modules can have various shapes to mimic anatomy that includes adjacent organ structures or tissues. For example, a non-tumor module can include a tubular form of silicone to mimic an intestine. The non-tumor and tumor modules 50 are removably connected to the module support 52 by any means known to one skilled in the art enabling the user to discard a module after use and then to continue practicing by replacing the discarded module or moving to an adjacent module 50 in the module support 52 or changing out a tumor module 50 for another tumor module 50 having a different feature or level of difficulty.

Figure 8:
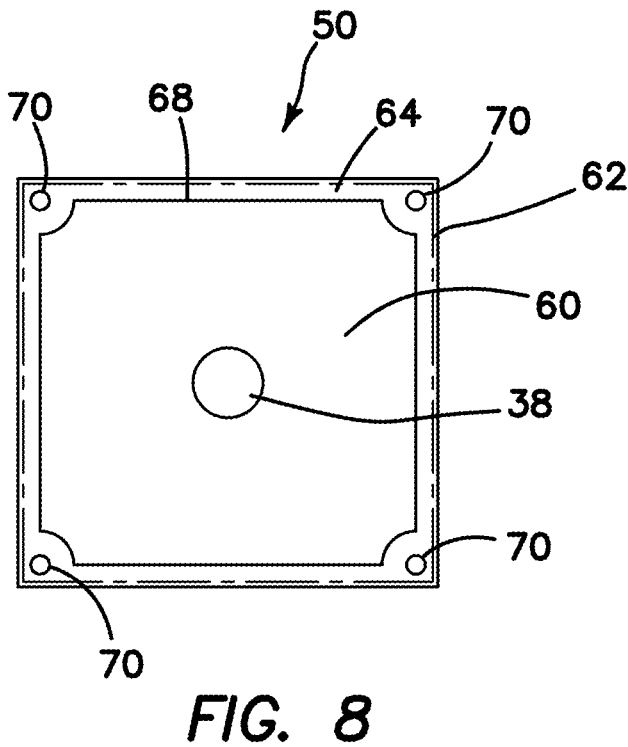
FIG. 8 illustrates a top view of a modular tissue structure according to the present invention.
Figure 9:
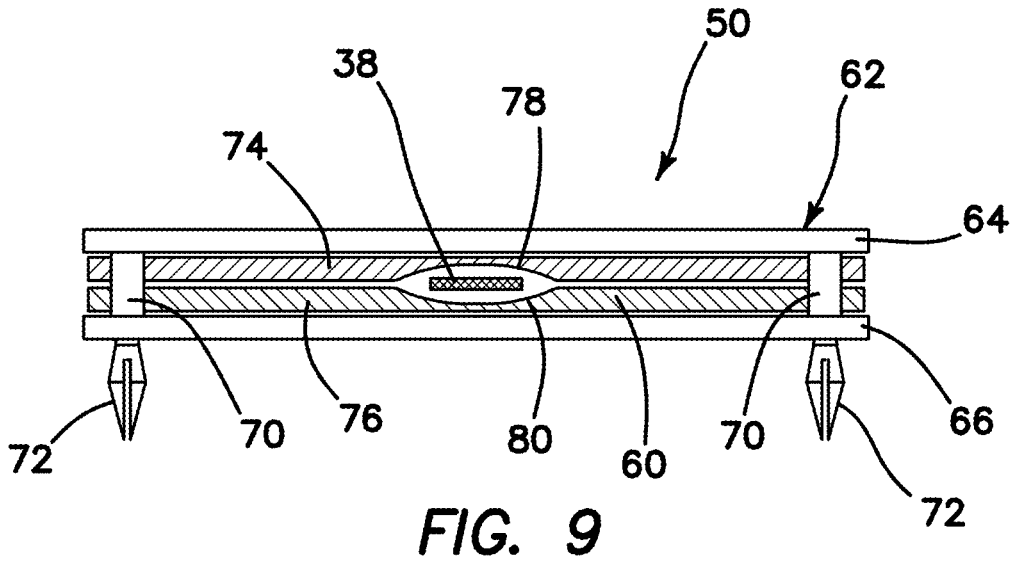
FIG. 9 illustrates a side view of a modular tissue structure according to the present invention.

A variation of the tumor module 50 is shown in FIGS. 8 and 9. The tumor module 50 includes a simulated tissue portion 60 connected to a support 62. In the variation shown, the support 62 includes a top frame 64 connected to a bottom frame 66. At least one of the top frame 64 and bottom frame 66 includes a window. The top frame 64 having a window 68 is shown in FIG. 8. The bottom frame 66 may or may not include a window. If windows are provided in both the top frame 64 and the bottom frame 66, the windows are aligned at least in part. The support 62 is sized and configured to receive a simulated tissue portion 60 between the top frame 64 and the bottom frame 66. The top frame 64 is connectable to the bottom frame 66 to capture the unitary simulated tissue portion 60 or a simulated tissue portion 60 formed from multiple layers and, in one variation, separable. In one variation, the frames 64, 66 are spaced apart from each other using spacers 70. Furthermore, at least one of the top and bottom frames 64, 66 includes one or more connecting features 72 configured to secure the tumor module 50 to a tumor support 52 (not shown). In FIG. 9, the connecting features 72 are shown as extending pegs for insertion into corresponding holes formed in the tumor support 52 to provide a snap-fit engagement. A friction fit or other fasteners or connecting means such as hook-and-loop type materials can be employed on the module 50 and module support 52 to connect the module 50 to the support 52 in a removable fashion.

Still referencing FIGS. 8 and 9, the simulated tissue portion 60 can be any of the constructs described above with reference to FIGS. 2-5. With windows formed in both the first and second frames 64, 66, the simulated tissue portion 60 can be approached from either side of the module 50. Any layer described above as a cover layer may act as a top layer or as a bottom layer depending on from which side or direction the simulated tissue portion 60 is approached. For example, a base layer may also serve as a top layer or as a bottom layer depending on which side or direction the simulated tissue portion 60 is approached. In such, bi-directional constructs, the thicknesses and colors of the layers may be adjusted accordingly to provide the desired simulated effect.

The simulated tissue portion 60 in FIG. 9 includes a first layer 74 and a second layer 76. The first and second layers 74, 76 are made from a polymeric material configured to mimic real live tissue such as silicone or other polymer and can include dye of any one or more appropriate colors or mesh, fabric, or other reinforcement. Each of the layers 74, 76 includes a tumor receiving portion 78, 80, respectively. Each tumor receiving portion 78, 80 is a concavity, indent, half-pocket or a location of reduced layer thickness that is formed in the layers 74, 76. The tumor receiving portions 78, 80 are substantially aligned to form a pocket for the tumor 38. Although each layer 74, 76 in FIG. 9 is shown with a tumor receiving portion 78, 80, a single tumor receiving portion is formed in at least one of the first and second layers 74, 76 in one variation. A tumor 38 is disposed within the pocket formed by one or more tumor receiving portions 78, 80 formed in the one or more layers 74, 76. The tumor 38 may be adhered to either layer 74, 76 or free floating inside the pocket. As shown in FIG. 9, the tumor receiving portion formed in a layer can be considered to be one type of defect and the variation of FIG. 9 describes a simulated tissue construct comprising two defect layers with a tumor ther-ebetween. As a user approaches the simulated tissue portion 60, the user will see the target tumor location. Visualization of the target tumor 38 is enhanced by the tumor receiving portion being thinner in thickness relative to the rest of the layer with the thinning of the layer being provided by the concavity or pocket. The user will then cut in the general location of the tumor cutting into at least one of the layers 74, 76 to remove the tumor 38. Cutting through one or more layers completes the creation of a gap or full defect which the user can then practice suturing or otherwise closing together. In another variation, there is no tumor receiving portion formed in the layers 74, 76. In such a variation, at least one tumor is disposed between the two layers 74, 76 wherein the layers 74, 76 have a substantially uniform thickness with the tumor 38 creating a minor bulge in the layers.

Figure 10A:
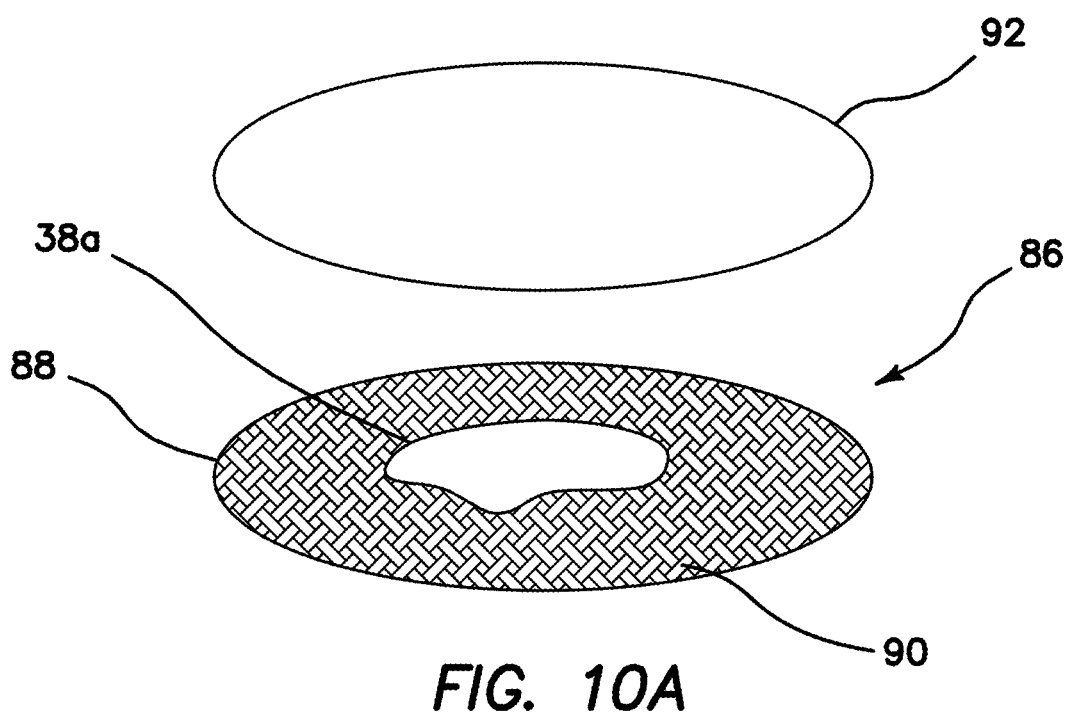
FIG. 10A illustrates a perspective view of a simulated tissue structure according to the present invention.
Figure 10B:
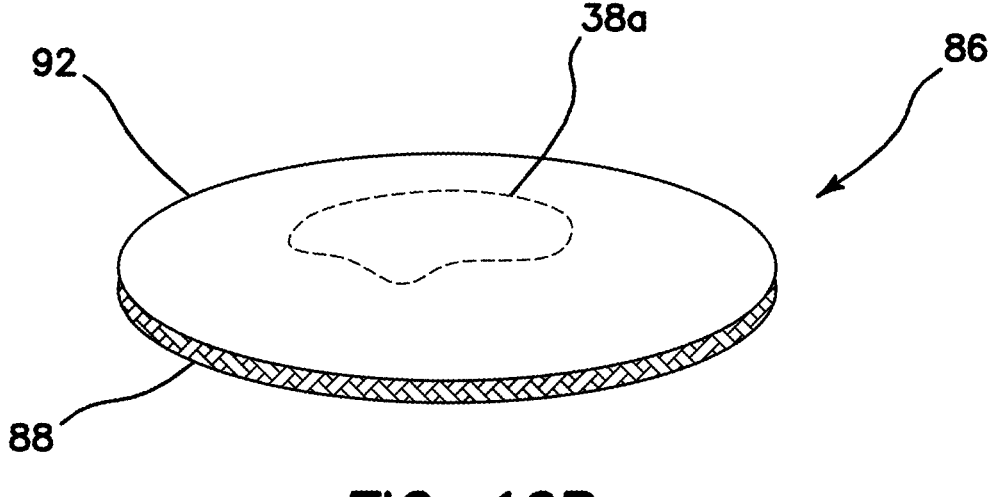
FIG. 10B illustrates a perspective view of a simulated tissue structure according to the present invention.
Figure 11A:
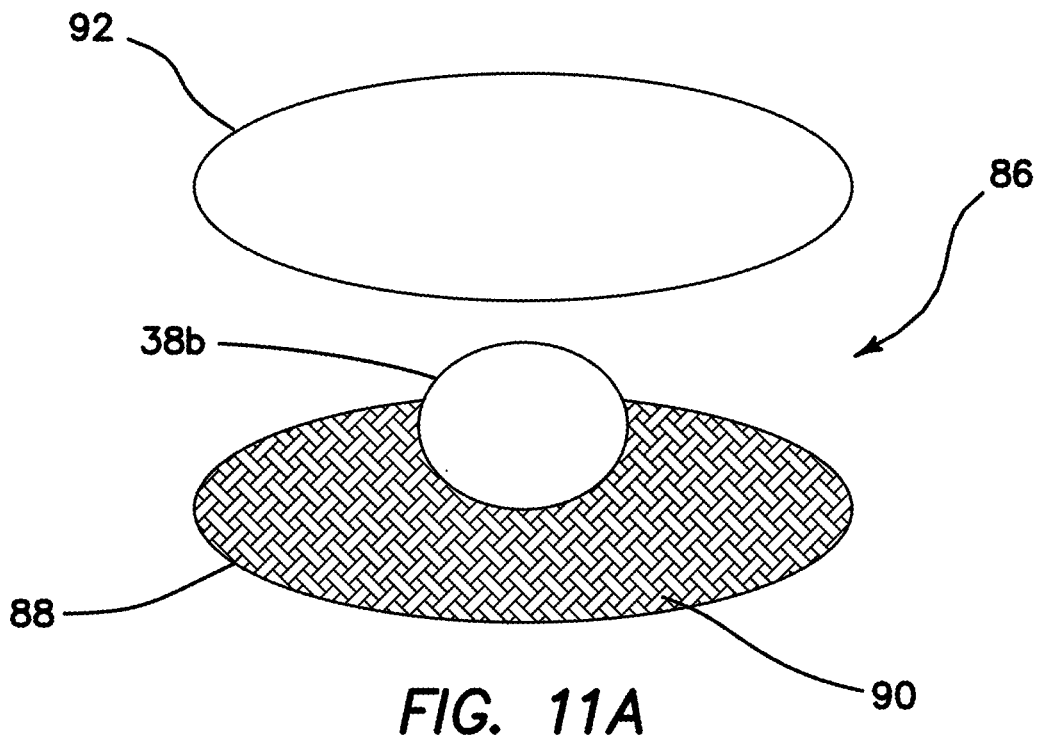
FIG. 11A illustrates a perspective view of a simulated tissue structure according to the present invention.
Figure 11B:
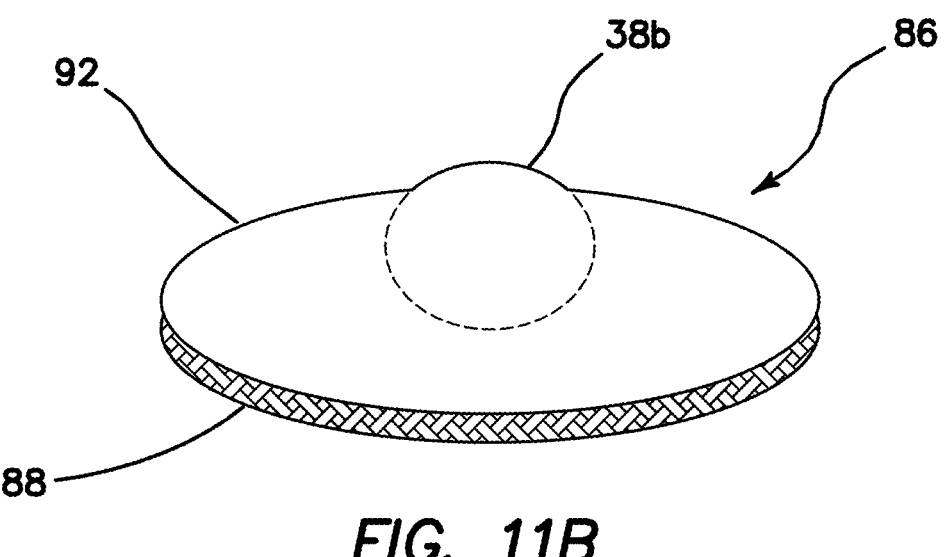
FIG. 11B illustrates a perspective view of a simulated tissue structure according to the present invention.
Figure 12:
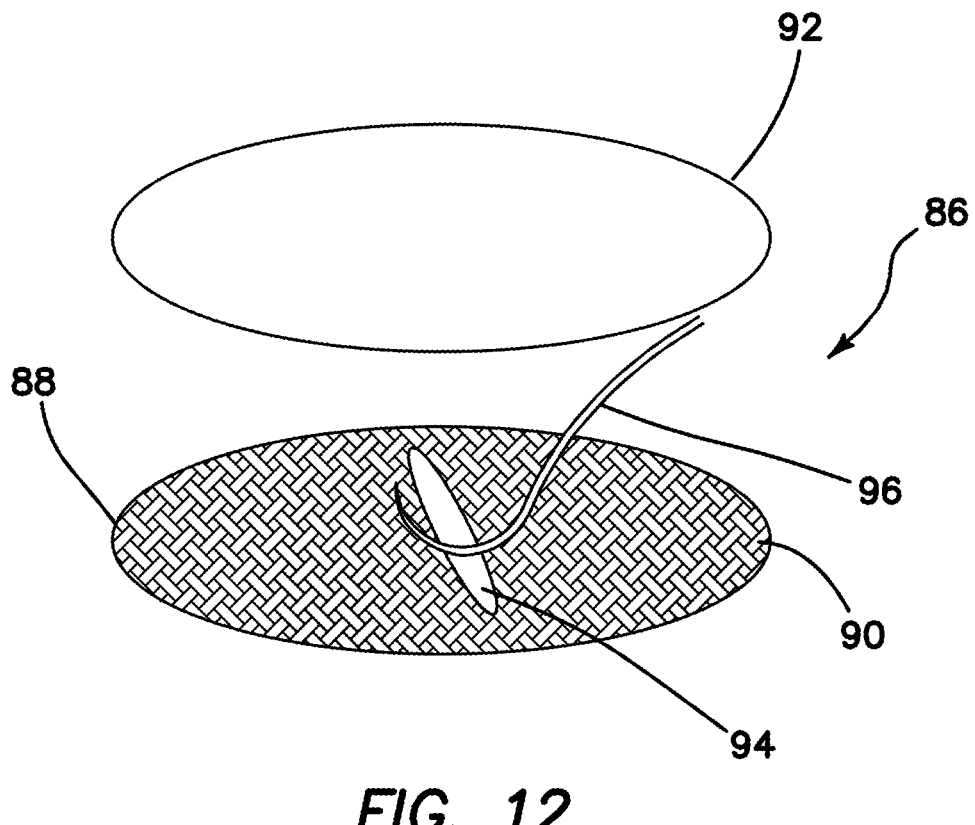
FIG. 12 illustrates a perspective view of a suture needle and a simulated tissue structure according to the present invention.

Turning now to FIGS. 10A, 10B, 11A, 11B and 12, there is shown another variation of a simulated tissue portion 86. The tissue portion 86 can be integral or modular as described above. The tissue portion 86 includes a base layer 88 formed of any suitable polymeric material such as silicone or other elastomeric polymer that may or may not include a rein-forcement material such as fabric, mesh, nylon or other reinforcement material or filler that will resist tearing while carrying sutures or while being sutured. The base layer 88 is connected to a defect layer 90 that is overlaid onto the base layer 88. The defect layer 90 includes a plurality of protru-sions extending upwardly from the base layer 88. The defect layer 90 may be integrally formed with the base layer 88 or be a separate layer that is adhered to the base layer 88. As can be seen in FIGS. 10A, 11A and 12, the defect layer 90 is configured into a lattice shaped pattern such that the lattice is raised above the base layer 88 or projects upwardly from the base layer 88. A lattice pattern is exemplary and any shape may be formed by the defect layer 90 such that it contains a plurality of adjacent projections. These projec-tions of the base layer 90 provide the user with locations to hook a suture needle into and as a platform to raise the tumor 38a, 38b above the base layer 88 for easy excision. The tumors 38a, 38b may be adhered to the defect layer 90 and a cover layer 92 may be included in one variation. FIGS. 10A and 11A show the base layer 88, defect layer 90, tumors 38a, 38b and a cover layer 92 in a semi-exploded view of the simulated tissue portion 86 wherein the cover layer 92 is raised above the other layers. The tumor 38a of FIG. 10a is substantially planar and is shown covered in FIG. 10B by the cover layer 92. Tumor 38b of FIG. 11A has greater height and is substantially spherical in shape and FIG. 11B shows the spherical tumor 38b covered with the cover layer 92 leaving a raised portion or protuberance in the construct. FIG. 12 shows the tumor 38 being removed leaving a remnant defect 94 in the base layer 88 and a suture needle crossing the gap in the defect 94 with the defect having been accessed under or through the cover layer 92.

While certain embodiments have been particularly shown and described with reference to exemplary embodiments thereof, it will be understood by those of ordinary skill in the art that various changes in form and details may be made therein without departing from the spirit and scope thereof as defined by the following claims.

We claim:

1. A simulated tissue structure for training the surgical removal of tumors, comprising:
   a simulated tissue portion comprising:
     a base layer;
     a defect layer located above and connected to the base layer, the defect layer including a defect defining a gap; and
     a simulated tumor mass located above the defect layer and overlaying at least a portion of the defect,
     wherein the defect layer is a multi-part layer compris-ing a plurality of juxtaposed pieces, and wherein the gap is defined between two opposed surfaces of the plurality of juxtaposed pieces.

2. The simulated tissue structure of claim 1 wherein the plurality of juxtaposed pieces form multiple defects between any two opposed surfaces of the plurality of juxtaposed pieces; the multiple defects having varying shapes and thicknesses.

3. The simulated tissue structure of claim 1 further comprising a cover layer above the base layer and overlay-ing the simulated tumor mass, wherein the cover layer is transparent or translucent.

4. The simulated tissue structure of claim 3 wherein at least one of the base layer, defect layer and cover layer includes a mesh material.

5. The simulated tissue structure of claim 1 wherein the defect layer is either formed integrally with the base layer or as a separate layer that is adhered to the base layer.

6. The simulated tissue structure of claim 1 wherein the defect has a circular, elongate, rectangular, elliptical or an amorphic shape, when viewed from the top.

7. The simulated tissue structure of claim 1 wherein the simulated tumor mass is made of silicone material.

8. The simulated tissue structure of claim 1 wherein the simulated tissue portion is configured such that a remnant defect in the simulated tissue portion is created after exci-sion of the simulated tumor mass; the remnant defect being surgically closable with sutures and staples.

9. The simulated tissue structure of claim 1 wherein the simulated tissue portion comprises a tumor-receiving por-tion configured to locate the simulated tumor mass; the tumor-receiving portion comprising a concavity, indent, half-pocket or a location of reduced thickness.

10. The simulated tissue structure of claim 1 wherein the base layer is tubular in shape having an outer perimeter; the base layer being either planar or non-planar.

11. The simulated tissue structure of claim 10 wherein the defect layer is tubular in shape having an outer perimeter; the defect layer being connected to the base layer such that the outer perimeter of the base layer and the outer perimeter of the defect layer are aligned.

12. The simulated tissue structure of claim 1 further comprising a support sized and configured to receive the simulated tissue portion; the support having a top frame connected to a bottom frame, wherein at least one of the top frame and bottom frame comprises a window.

13. The simulated tissue structure of claim 12 wherein each of the top frame and bottom frame comprises a window, and the windows of the top and bottom frames are aligned with each other.

14. The simulated tissue structure of claim 1 further comprising:

a module support comprising at least one module-receiving portion formed in the module support; and a simulated tumor module sized and configured to be removably and interchangeably inserted into the at least one module-receiving portion, the simulated tumor module comprising the simulated tissue portion.

15. The simulated tissue structure of claim 14 wherein the module support is shaped to mimic a human uterus or at least in part to simulate a human organ.

16. The simulated tissue structure of claim 1 wherein the defect layer includes a plurality of protrusions extending from the base layer; the plurality of protrusions in the defect layer are configured into a lattice shaped pattern raising above the base layer or projecting upwardly from the base layer, wherein the upward projections from the base layer provide locations for hooking a suture needle while providing a platform to raise the simulated tumor mass for excision.

17. A system comprising a surgical training device configured to mimic a torso and the simulated tissue structure of claim 1.

18. The system of claim 17 wherein the surgical training device comprises a base and a top cover connected to and spaced apart from the base to define an internal cavity between the top cover and the base; the top cover comprising an opening and an insert sized and configured to fit into the opening of the top cover and connect thereto.

19. The system of claim 18 wherein the simulated tissue structure is configured for suspension and connection to the insert of the top cover, or for placement inside the internal cavity.

20. The simulated tissue structure of claim 18 wherein the internal cavity is at least partially obstructed from direct observation by a user.

* * * * *